(12) United States Patent
Libby

(10) Patent No.: US 11,708,863 B2
(45) Date of Patent: Jul. 25, 2023

(54) QUICK DISCONNECT SYSTEM

(71) Applicant: James A K Libby, Kingston, MA (US)

(72) Inventor: James A K Libby, Kingston, MA (US)

( * ) Notice: Subject to any disclaimer, the term of this patent is extended or adjusted under 35 U.S.C. 154(b) by 0 days.

(21) Appl. No.: 17/865,083

(22) Filed: Jul. 14, 2022

(65) Prior Publication Data
US 2023/0032670 A1    Feb. 2, 2023

Related U.S. Application Data

(60) Provisional application No. 63/203,816, filed on Jul. 30, 2021.

(51) Int. Cl.
*F16D 11/14* (2006.01)
*F16D 11/00* (2006.01)

(52) U.S. Cl.
CPC ........ *F16D 11/14* (2013.01); *F16D 2011/006* (2013.01)

(58) Field of Classification Search
CPC . F16D 2127/04; F16D 11/14; F16D 2011/006
See application file for complete search history.

(56) References Cited

U.S. PATENT DOCUMENTS

| | | | | |
|---|---|---|---|---|
| 4,685,550 A | * | 8/1987 | Metcalf | H02K 16/00 192/114 R |
| 5,658,087 A | * | 8/1997 | Butkovich | F16D 11/14 403/328 |
| 2002/0112934 A1 | * | 8/2002 | Karambelas | F16D 11/14 192/69.43 |
| 2004/0159518 A1 | * | 8/2004 | Oberheide | F16D 11/14 192/69.9 |

OTHER PUBLICATIONS

Automan Junior video posted to https://www.facebook.com/automanjr/ on Jun. 3, 2019 with 0.33 seconds length. Screenshots of video attached. Referenced as "Automan". (Year: 2019).*

Automan Junior facebook post part 1, posted on Jun. 3, 2019 illustrating text description. Obtained from https://www.facebook.com/automanjr/. Screenshot of the entire post attached. (Year: 2019).*

Automan Junior facebook post part 2, posted on Jun. 3, 2019, illustrating still images including wheels. Obtained from https://www.facebook.com/automanjr/. Screenshot of the entire post attached. (Year: 2019).*

(Continued)

*Primary Examiner* — Stacey A Fluhart
(74) *Attorney, Agent, or Firm* — Knobbe Martens Olson & Bear LLP

(57) ABSTRACT

A quick disconnect system includes a main shaft, a sprocket shaft mounted around the main shaft, a coupler configured to move relative to the main shaft and the sprocket shaft between a connected configuration wherein the coupler is configured to connect the main shaft to the sprocket shaft such that torque is transferred between the main shaft and the sprocket shaft, and a disconnected configuration wherein the main shaft is configured to rotate relative to the sprocket shaft, and a release button configured to be actuated to release the coupler from the connected configuration or the disconnected configuration.

32 Claims, 28 Drawing Sheets

(56) References Cited

OTHER PUBLICATIONS

"Automan Junior Quick Disconect!" Facebook, dated as uploaded by Automan Junior, Jun. 3, 2019, https://facebook.com/automanjr/videos/304129630539931/. Accessed Oct. 12, 2022.

"Automan Junior." *Facebook*, dated as uploaded by Automan Junior, Jun. 3, 2019, https://www.facebook.com/photo/?fbid=1269681706529705&set=pcb.1269681953196347. Accessed Oct. 14, 2022.

"Automan Junior." *Facebook*, dated as uploaded by Automan Junior, Jun. 3, 2019, https://facebook.com/automanir/photos/a.1269681946529681/1269682683196274/. Accessed Oct. 14, 2022.

"Automan Junior." *Facebook*, dated as uploaded by Automan Junior, Jul. 13, 2021, https://www.facebook.com/automanjr/photos/a.1631748603656345/1931133567051179/. Accessed Oct. 14, 2022.

"Automan Junior." Facebook, dated as uploaded by Automan Junior, Jul. 13, 2021, https://www.facebook com/photo/?fbid=1931597453671457&set=pcb.1931597653671437. Accessed Oct. 14, 2022.

\* cited by examiner

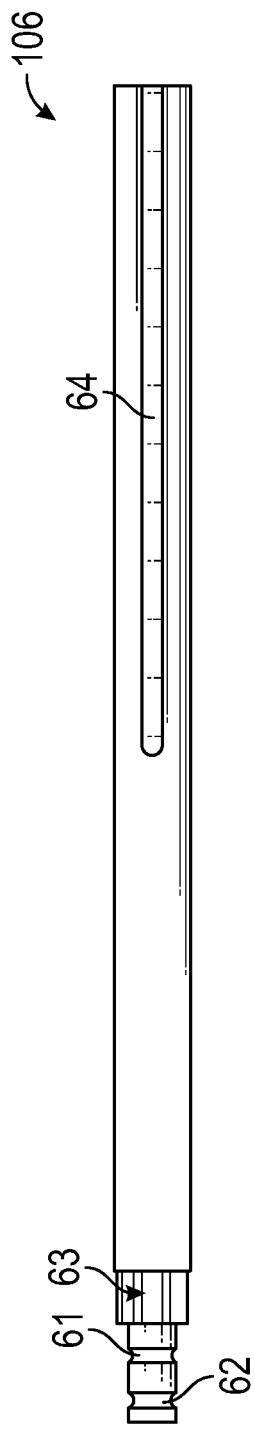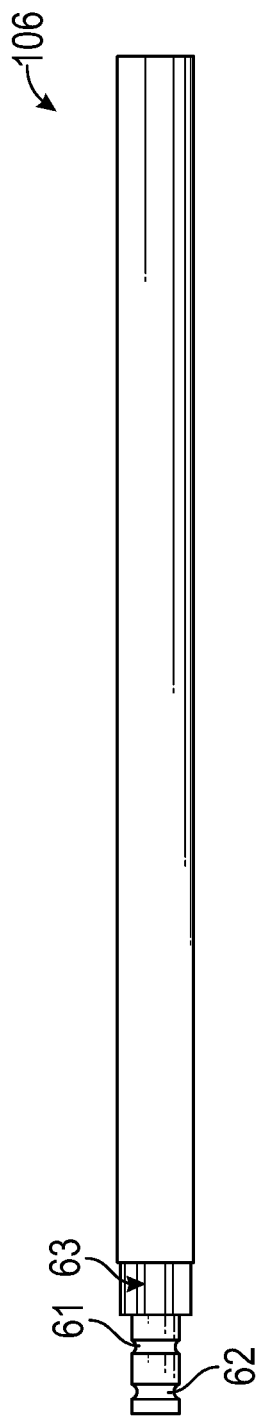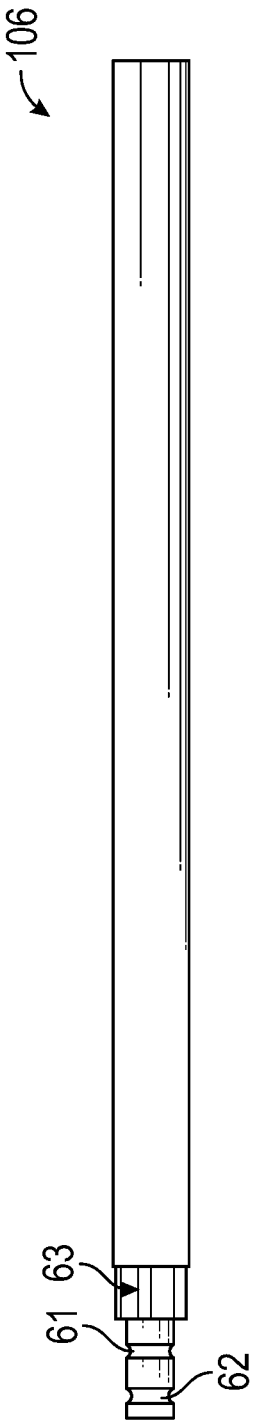

QUICK DISCONNECT SYSTEM

CROSS-REFERENCE TO RELATED APPLICATIONS

The present application claims priority to U.S. Provisional Application No. 63/203,816, entitled "QUICK DISCONNECT SYSTEM", filed on Jul. 30, 2021, which is hereby incorporated herein by reference in its entirety and made part of the present application for all purposes.

TECHNICAL FIELD

The present disclosure relates to a quick disconnect system. More particularly, the present disclosure relates to a quick disconnect system for use with a vehicle.

BACKGROUND

Junior Dragsters are drag racing vehicles that compete nationally and locally at drag racing facilities around the United States. The primary sanctioning body for these competitions is the NHRA (National Hot Rod Association). The NHRA's division for junior dragster racing is the JDRL (Junior Drag Racing League). To move a traditional Junior Dragster to and from a racetrack or the pits (the area in which the Junior Dragsters are setup), a user typically manually removes a belt in order to disconnect the engine from the rear wheels of the Junior Dragster and allow the Junior Dragster to roll freely. In other words, for example, before racing a Junior Dragster on the racetrack, a user removes the belt, moves the Junior Dragster to the racetrack, and reinstalls the belt.

SUMMARY

The disclosure relates generally to a quick disconnect system. More specifically, various embodiments of this disclosure relate to a quick disconnect system for a vehicle. The quick disconnect system may allow a user to quickly and conveniently disconnect an engine and rear wheels. Such a quick disconnect system can also be applied in any other situations where quick disconnection between two in-line shafts is desirable.

In one aspect, a quick disconnect system is provided. The system includes a main shaft, a sprocket shaft mounted around the main shaft, a coupler configured to move relative to the main shaft and the sprocket shaft between a connected configuration wherein the coupler is configured to connect the main shaft to the sprocket shaft such that torque is transferred between the main shaft and the sprocket shaft, and a disconnected configuration wherein the main shaft is configured to rotate relative to the sprocket shaft, and a release button configured to be actuated to release the coupler from the connected configuration or the disconnected configuration.

The system can include one or more engagement features configured to be housed by the coupler and to engage the main shaft. The main shaft can include a first groove and a second groove configured to receive the one or more engagement features. In the connected configuration, the one or more engagement features can be positioned within the first groove of the main shaft. In the disconnected configuration, the one or more engagement features can be positioned within the second groove of the main shaft. The one or more engagement features can include one or more balls. The system can include a handle configured to move the coupler relative to the main shaft and the sprocket shaft. In the connected configuration, one or more interlocking elements of the main shaft can interlock with one or more main shaft complementary interlocking elements of the coupler, and one or more interlocking elements of the sprocket shaft can interlock with one or more sprocket shaft complementary interlocking elements of the coupler. The one or more main shaft complementary interlocking elements of the coupler can be disposed on an inner surface of an interlocking body of the coupler; and the one or more sprocket shaft complementary interlocking elements of the coupler can be disposed on an outer surface of the interlocking body of the coupler. The interlocking elements of the coupler, the main shaft, and the sprocket shaft can be interlocking teeth. The release button can be actuated by pressing on a front surface of the release button. The system can include a spring configured to return the release button from an actuated position to an unactuated position. The main shaft can be coupled to an engine of a vehicle. The sprocket shaft can be coupled to wheels of the vehicle. The quick disconnect system can be held in place within the vehicle by one or more bearing blocks.

In another aspect, a method for disconnecting a main shaft and a sprocket shaft is provided. The method includes actuating a release button to release a coupler from a connected configuration, wherein the coupler connects the main shaft to the sprocket shaft to facilitate a transfer of torque between the main shaft and the sprocket shaft in the connected configuration, moving a handle housing the release button and the coupler while actuating the release button to move the coupler to a disconnected configuration, wherein the main shaft is configured to rotate relative to the sprocket shaft in the disconnected configuration, and releasing the release button to secure the coupler in the disconnected configuration.

In the connected configuration, one or more engagement features can be positioned within a first groove of the main shaft. In the disconnected configuration, the one or more engagement features can be positioned within a second groove of the main shaft. Actuating the release button to release the coupler in the connected configuration can include actuating the release button to align a groove of the release button with the one or more engagement features such that the coupler is free to move relative to the main shaft and the sprocket shaft. The method can include actuating the release button to release the coupler from the disconnected configuration, moving the handle housing the release button and the coupler while actuating the release button to move the coupler to the connected configuration, and releasing the release button to secure the coupler in the connected configuration. The main shaft can be coupled to an engine of a vehicle and the sprocket shaft can be coupled to wheels of the vehicle. Actuating the release button can include pressing on a front surface of the release button. Releasing the release button can include allowing the release button to move from an actuated position to an unactuated position.

BRIEF DESCRIPTION OF THE FIGURES

FIG. 3C is a top view of the main shaft of FIG. 3A.

FIG. 3D is a bottom view of the main shaft of FIG. 3A.

FIG. 3E is a side view of the main shaft of FIG. 3A.

DETAILED DESCRIPTION

Figure 1A:
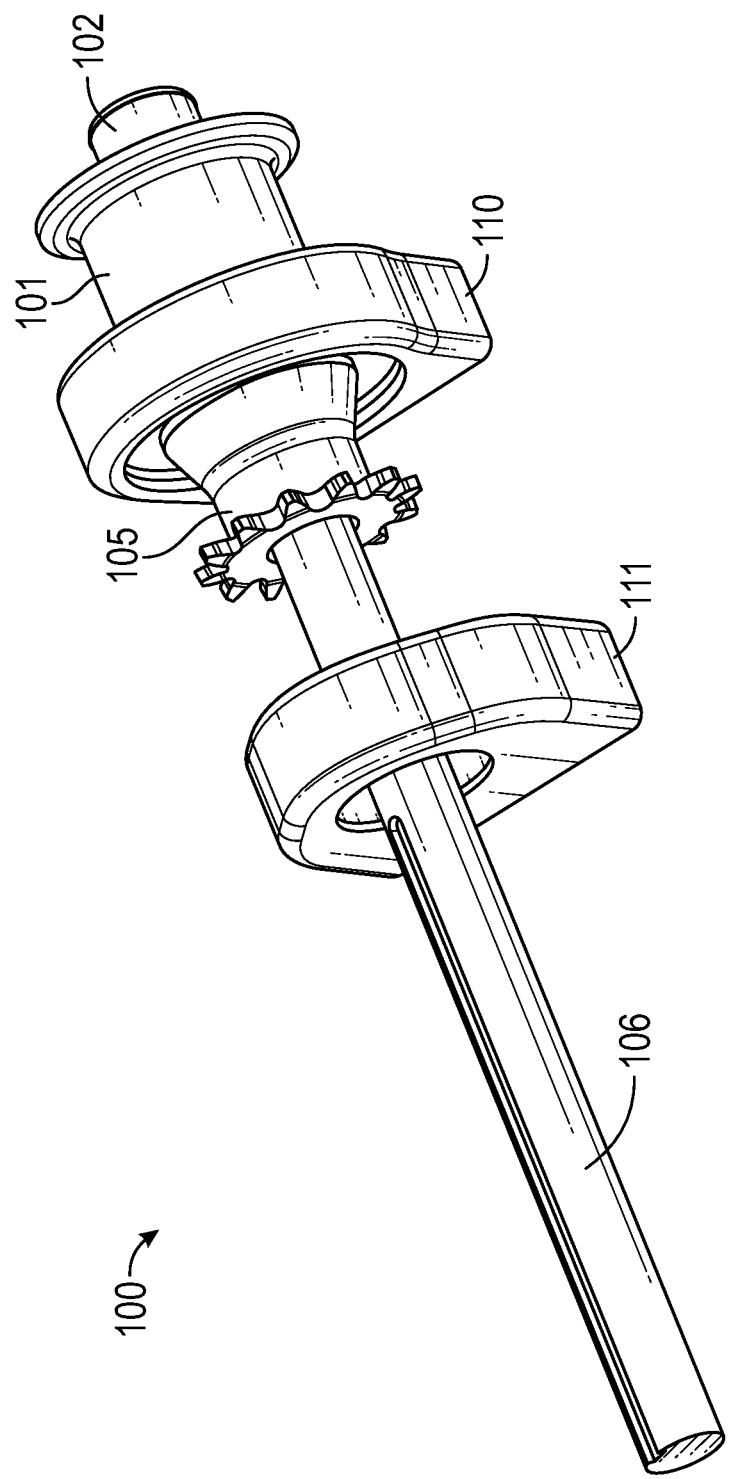
FIG. 1A is a top right perspective view of an embodiment of a quick disconnect system.

In the following detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary from figure to figure. The illustrative embodiments described herein are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

The following detailed description is directed to certain specific embodiments of the development. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments. Furthermore, embodiments of the development may include several novel features, no single one of which is solely responsible for its desirable attributes or which is essential to practicing the invention described herein.

In certain embodiments, a quick disconnect system can be used to conveniently disconnect and connect (e.g., rotationally) two in-line (e.g., coaxial) shafts. The quick disconnect system can include a coupler configured to move between a connected configuration, in which the two in-line shafts are connected (e.g., such that rotation of one of the two in-line shafts causes rotation of the other of the two in-line shafts), and a disconnected configuration, in which the two in-line shafts are disconnected (e.g., such that the two in-line shafts can rotate independently from one another). The quick disconnect system can further include an actuator, such as a release button or switch, that can be actuated by a user to allow the user to connect and disconnect the two in-line shafts. For example, the actuator can be actuated to release the coupler from the connected configuration or the disconnected configuration such that the coupler can move between the connected configuration and the disconnected configuration.

In certain embodiments, the quick disconnect system can be used to disconnect and connect two in-line shafts within a vehicle, such as a Junior Dragster. In certain embodiments, quick disconnect system can be used to disconnect and connect two in-line shafts within a vehicle that couple an engine of the vehicle with the rear wheels of the vehicle. In certain embodiments, the actuator can be actuated by a user to disconnect the two in-line shafts so as to disconnect the engine of the vehicle from the rear wheels (e.g., to allow the rear wheels to roll freely, or at least more freely than when the two in-line shafts are connected). In certain embodiments, the two in-line shafts can be disconnected without removing a belt that couples the engine to the rear wheels of the vehicle (e.g., a belt that is connected between the engine and the main shaft).

Figure 1B:
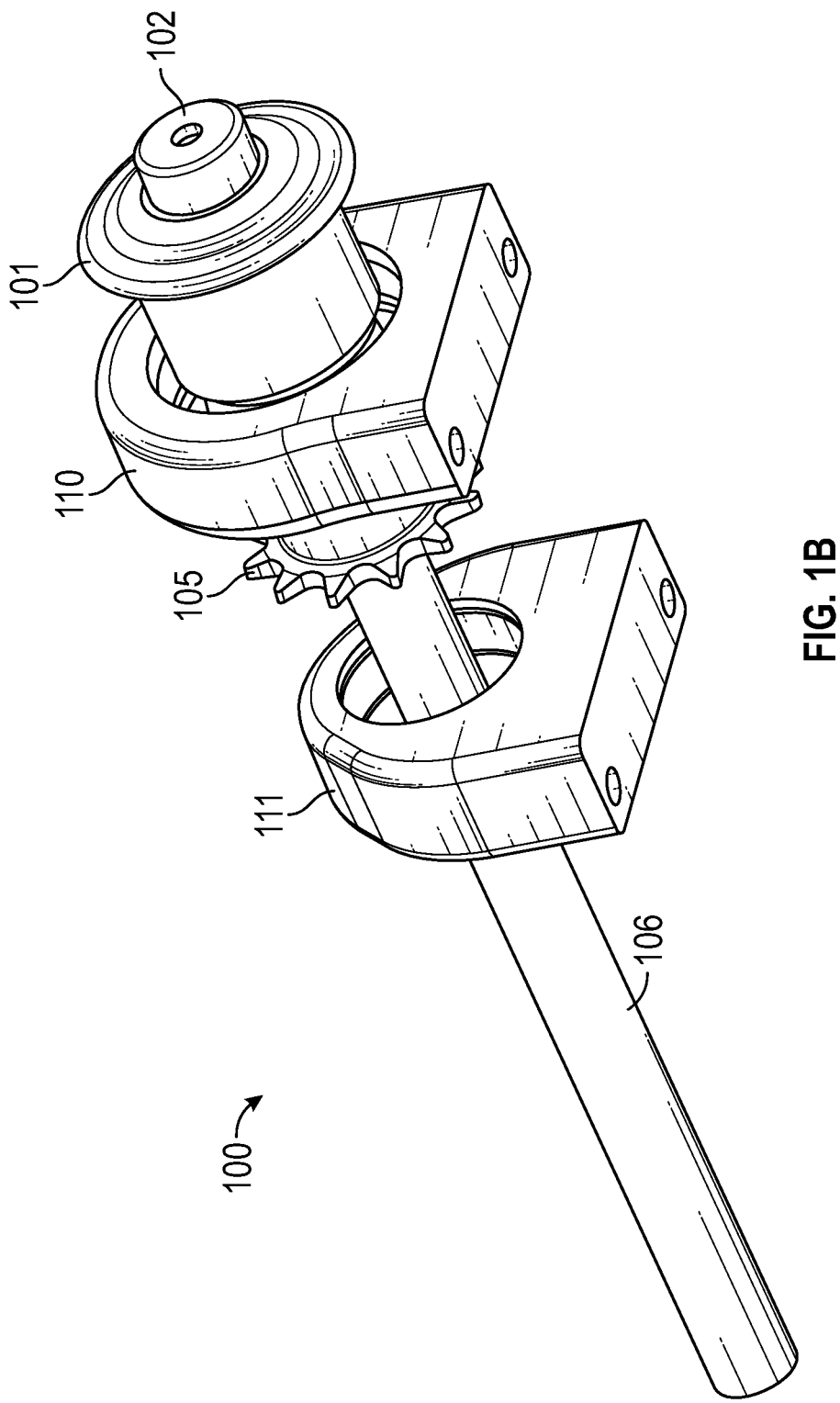
FIG. 1B is a bottom right perspective view of the quick disconnect system of FIG. 1A.
Figure 1C:
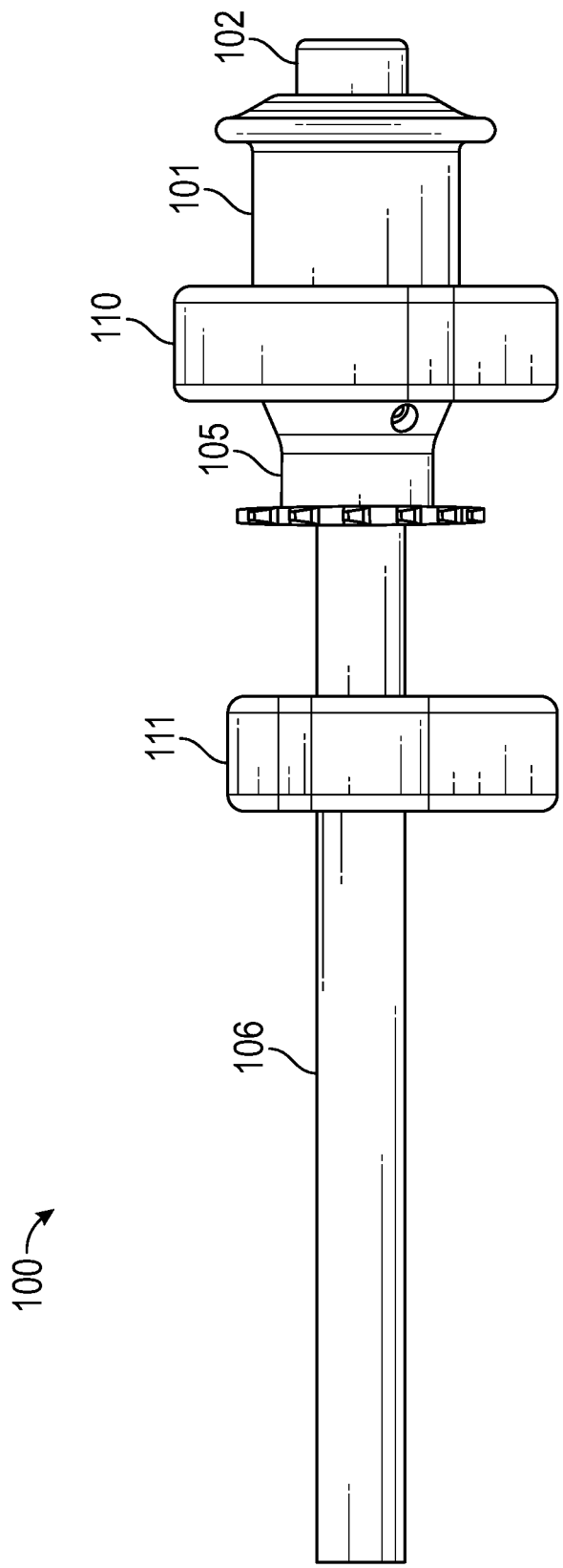
FIG. 1C is a right side view of the quick disconnect system of FIG. 1A.
Figure 1D:
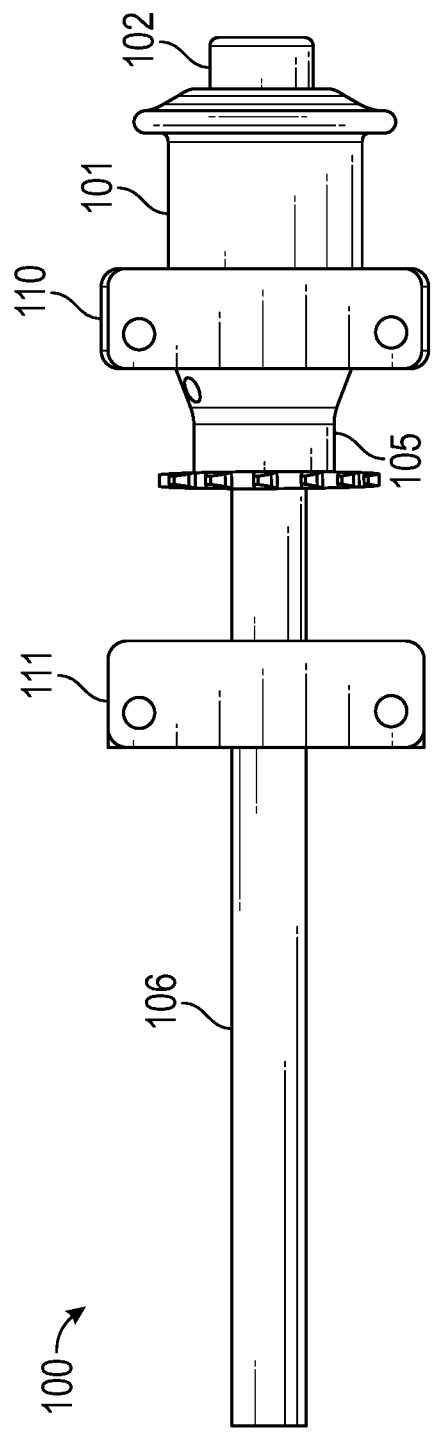
FIG. 1D is a bottom view of the quick disconnect system of FIG. 1A.
Figure 1E:
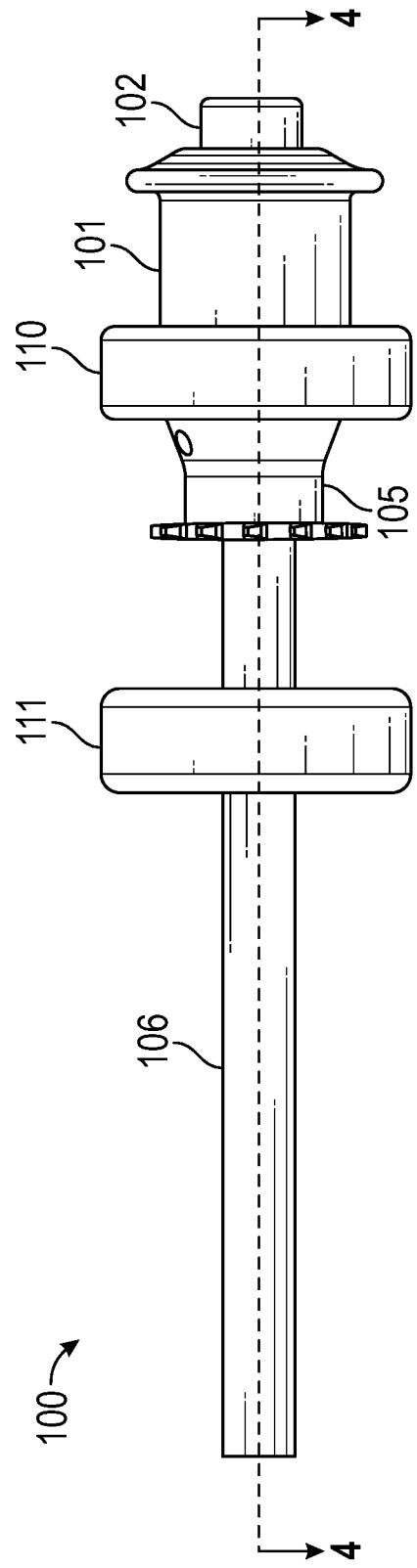
FIG. 1E is a top view of the quick disconnect system of FIG. 1A.

FIG. 1A depicts a top right perspective view of a quick disconnect system 100 according to an embodiment of this disclosure. FIG. 1B depicts a bottom right perspective view of the quick disconnect system 100. FIG. 1C depicts a right side view of the quick disconnect system 100. FIG. 1D depicts a bottom view of the quick disconnect system 100. FIG. 1E depicts a top view of the quick disconnect system 100.

As shown in FIGS. 1A-1E, the quick disconnect system 100 can include a drive shaft or main shaft 106. In certain embodiments, the quick disconnect system 100 can include a driven shaft or sprocket shaft 105. In certain embodiments, the sprocket shaft 105 is mounted around the main shaft 106. As described in further detail herein, the sprocket shaft 105 can be selectively connected and disconnected from the main shaft 106. When the sprocket shaft 105 is connected to the main shaft 106, rotation of the main shaft 106 can cause rotation of the sprocket shaft 105.

In certain embodiments, the main shaft 106 may be coupled to an engine of a vehicle, such as a Junior Dragster, which can drive rotation of the main shaft 106. For example, in certain embodiments, the main shaft 106 can connect (temporarily or permanently) to a pulley attached via a belt to the engine of a vehicle, allowing the engine to drive the main shaft 106. In certain embodiments, the sprocket shaft 105 can be coupled to the wheels (e.g., rear wheels) of a vehicle, for example via a chain, to drive the wheels. In certain embodiments, the sprocket shaft 105 can include a sprocket having teeth configured to couple to the chain. In such embodiments, when the sprocket shaft 105 is selectively connected to the main shaft 106, rotation of the main shaft 106 (e.g., when the main shaft is driven by the engine via the belt) can cause rotation of the sprocket shaft 105, which can in turn drive the rear wheels of the vehicle (e.g., via the chain).

In certain embodiments, the quick disconnect system 100 can include one or more bearing blocks. As shown in FIG. 1A, the system can include a bearing block 110 and a bearing block 111. The bearing blocks 110 and 111 can house bearings that hold the quick disconnect system 100 in place (e.g., on a vehicle), allow the main shaft 106 and/or sprocket shaft 105 to rotate, and/or the like.

In certain embodiments, the quick disconnect system 100 can include a coupler 104. The coupler 104 can selectively connect and disconnect the main shaft 106 and the sprocket shaft 105. For example, in certain embodiments, the coupler 104 can be moved between a connected configuration (as shown, for example, in FIG. 8A) in which the coupler 104 connects the main shaft 106 and the sprocket shaft 105, and a disconnected configuration (as shown, for example, in FIG. 9A) in which the coupler does not connect the main shaft 106 and the sprocket shaft 105.

In the connected configuration, the coupler 104 can connect the main shaft 106 and the sprocket shaft 105 so that torque can be transferred between the main shaft 106 and the sprocket shaft 105. In the disconnected configuration, the main shaft 106 can rotate with respect to the sprocket shaft 105.

In certain embodiments in which the quick disconnect system 100 is installed within a vehicle, in the connected configuration, the engine of the vehicle can be connected to the rear wheels of the vehicle via the connection between the main shaft 106 and the sprocket shaft 105. When the main shaft 106 and the sprocket shaft 105 are disconnected, for example, when the coupler 104 is in the disconnected configuration, the engine is disconnected from rear wheels of the vehicle, and the vehicle can roll freely, or at least more freely than when in the connected configuration. In the disconnected configuration, the sprocket shaft 105 can rotate about the main shaft 106, for example, via sleeve bearings.

As described in further detail herein, in certain embodiments, the coupler 104 can house one or more engagement features (e.g., balls) configured to selectively engage and disengage corresponding engagement features (e.g., grooves or recesses) of the main shaft and/or the sprocket shaft to secure the coupler in the connected and disconnected configurations.

In certain embodiments, the quick disconnect system 100 can include a release button 102. As shown in FIG. 1A, the release button 102 can be positioned within a handle 101. The handle 101 can house the release button 102 and the coupler 104. The handle 101 may also provide a surface for grasping by a user, and can be manipulated by the user to move the coupler 104 between the connected configuration and the disconnected configuration when the release button 102 is actuated, as described in further detail herein.

In certain embodiments, the release button 102 can be actuated, for example by pressing, by a user to move the coupler 104 between the connected configuration and the disconnected configuration. For example, in certain embodiments, the release button 102 can be actuated to release the engagement features (e.g., balls) housed by the coupler from the complementary engagement features (e.g., grooves or recesses) of the main shaft 106 and/or the sprocket shaft 105 to allow the coupler 104 to move between the connected and the disconnected configurations.

Figure 2A:
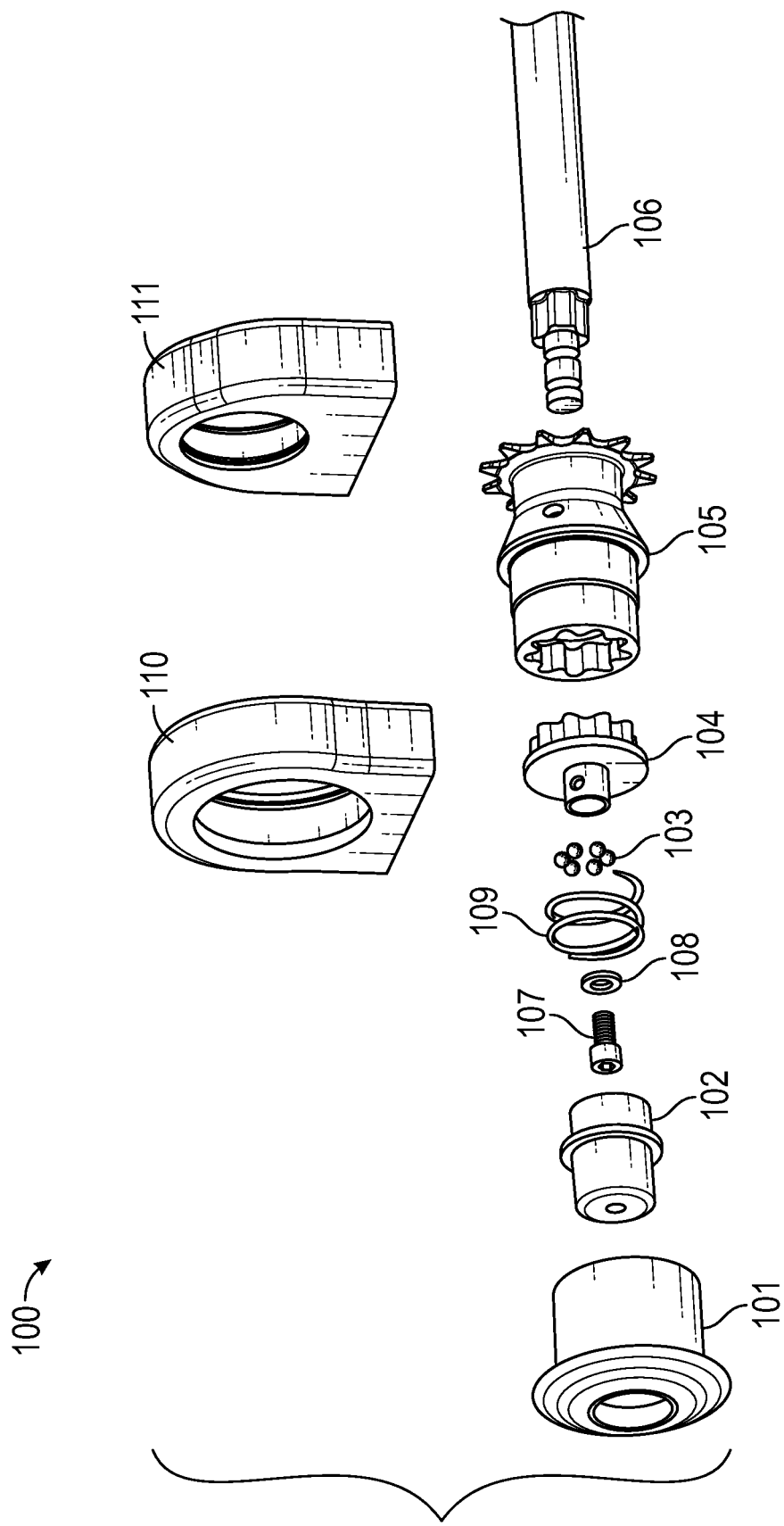
FIG. 2A is a front perspective exploded view of the quick disconnect system of FIG. 1A.
Figure 2B:
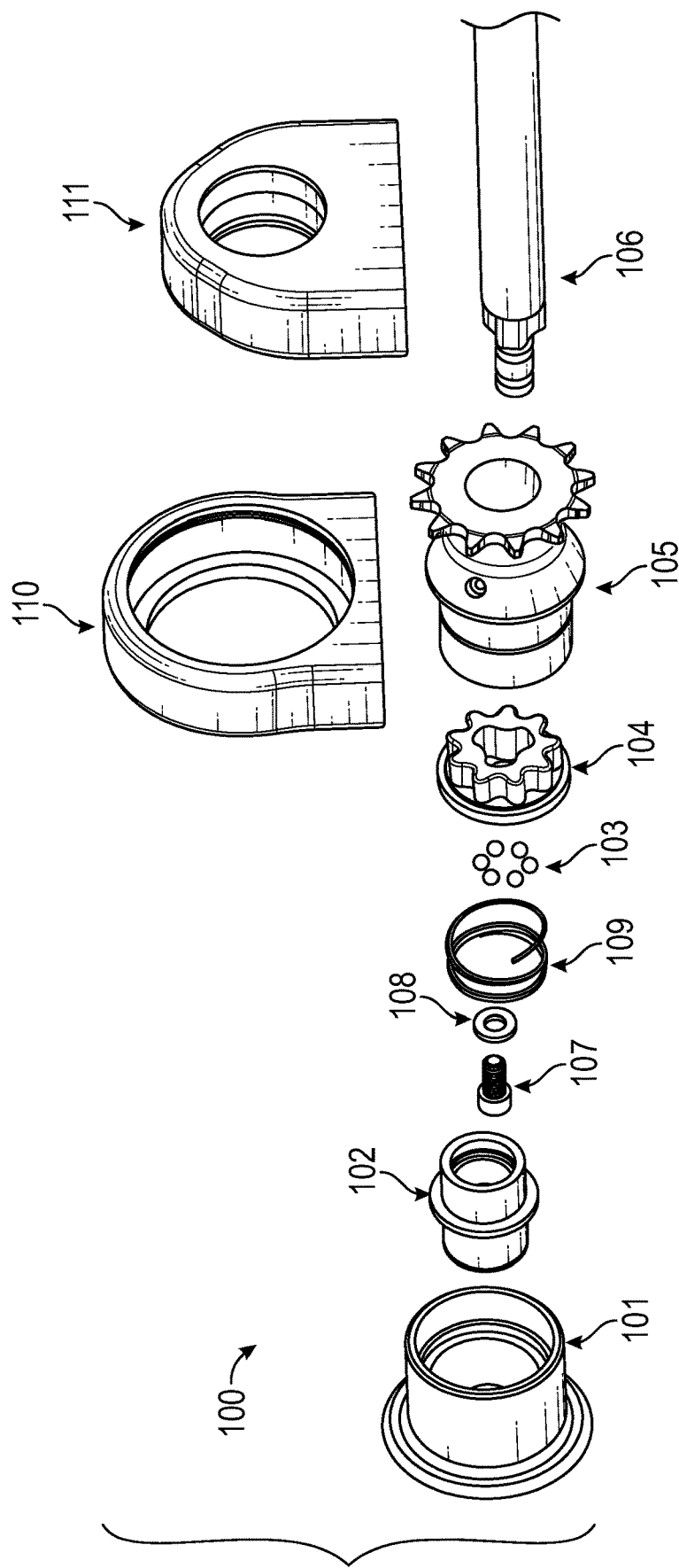
FIG. 2B is a back perspective exploded view of the quick disconnect system of FIG. 1A.

FIG. 2A depicts a front perspective exploded view of the quick disconnect system 100. FIG. 2B depicts a back perspective exploded view of the quick disconnect system 100.

As shown in FIGS. 2A-2B, the quick disconnect system 100 can further include one or more balls 103. As described in further detail herein, the balls 103 can be housed within the coupler 104 and act as engagement features to engage complementary engagement features (e.g., grooves or recesses) of the main shaft 106 and/or the sprocket shaft 105.

In certain embodiments, the quick disconnect system 100 can include a spring 109. The spring 109 can be positioned within the handle 101 to cause the release button 102 to return to an unactuated position after release by a user.

In some embodiments, the quick disconnect system 100 can further include a retaining screw 107 and a washer 108. The retaining screw 107 and washer 108 can be attached to an end of the main shaft 106 and housed inside the release button 102.

Figure 3A:
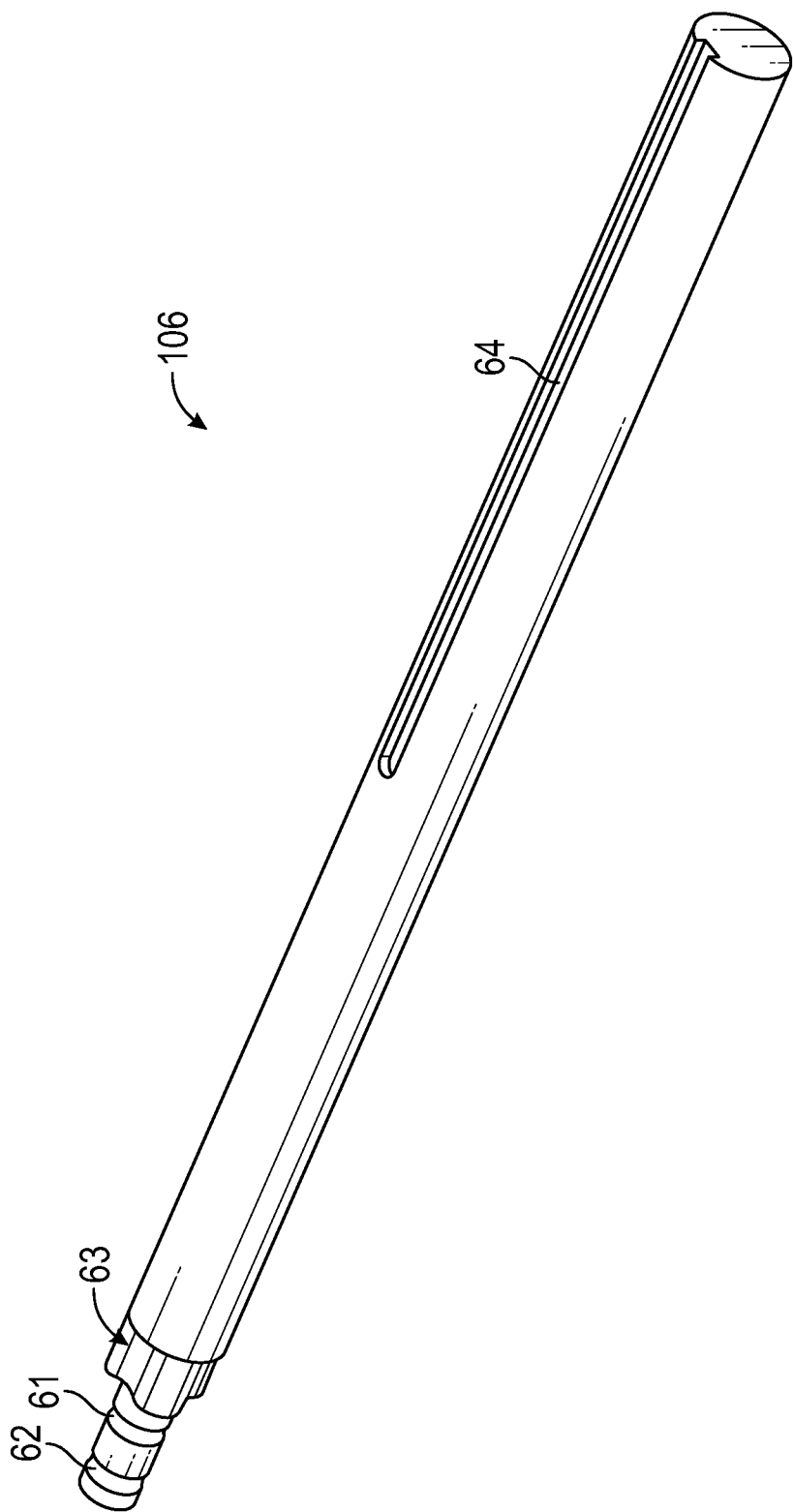
FIG. 3A is a top left perspective view of a main shaft of the quick disconnect system of FIG. 1A.
Figure 3B:
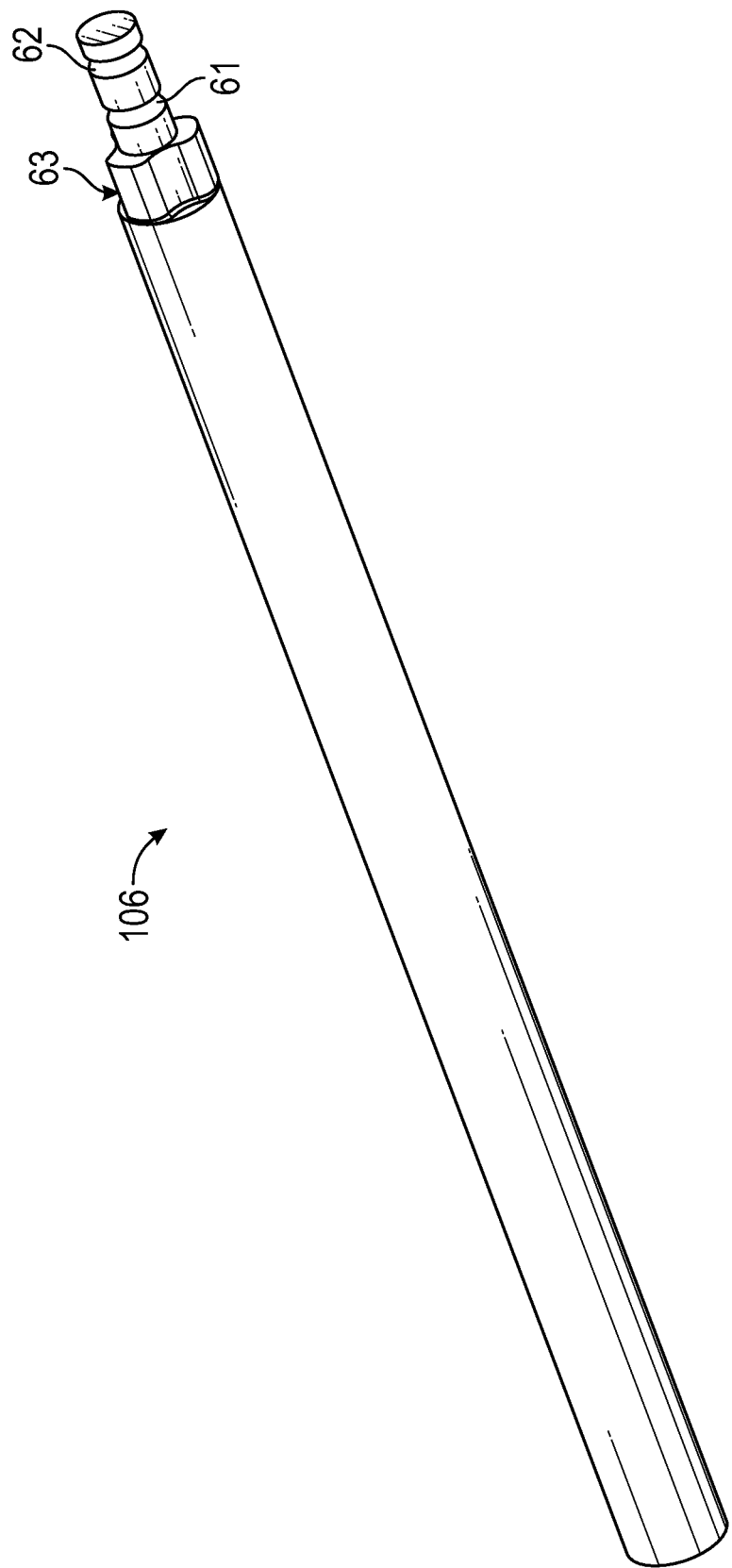
FIG. 3B is a bottom right perspective view of the main shaft of FIG. 3A.

FIG. 3A depicts a top left perspective view of a main shaft 106 of the quick disconnect system 100. FIG. 3B depicts a bottom right perspective view of the main shaft 106. FIG. 3C depicts a top view of the main shaft 106. FIG. 3D depicts a bottom view of the main shaft 106. FIG. 3E depicts a side view of the main shaft 106.

As shown in FIGS. 3A-3E, the main shaft 106 of the quick disconnect system 100 can include a first groove 61 and a second groove 62. The first groove 61 can be configured to engage with the balls 103 in the connected configuration. The second groove 62 can be configured to engage with the balls 103 in the disconnected configuration.

In some embodiments, the main shaft 106 can include one or more interlocking elements 63 configured to interlock with complementary interlocking elements of the coupler 104.

In some embodiments, the main shaft 106 can further include a cutout 64. The cutout 64 may be a keyway. As described in further detail herein, an engine can be connected to the main shaft 106 through a belt on a pulley. The keyway 64 can receive a key connected to the pulley.

Figure 4B:
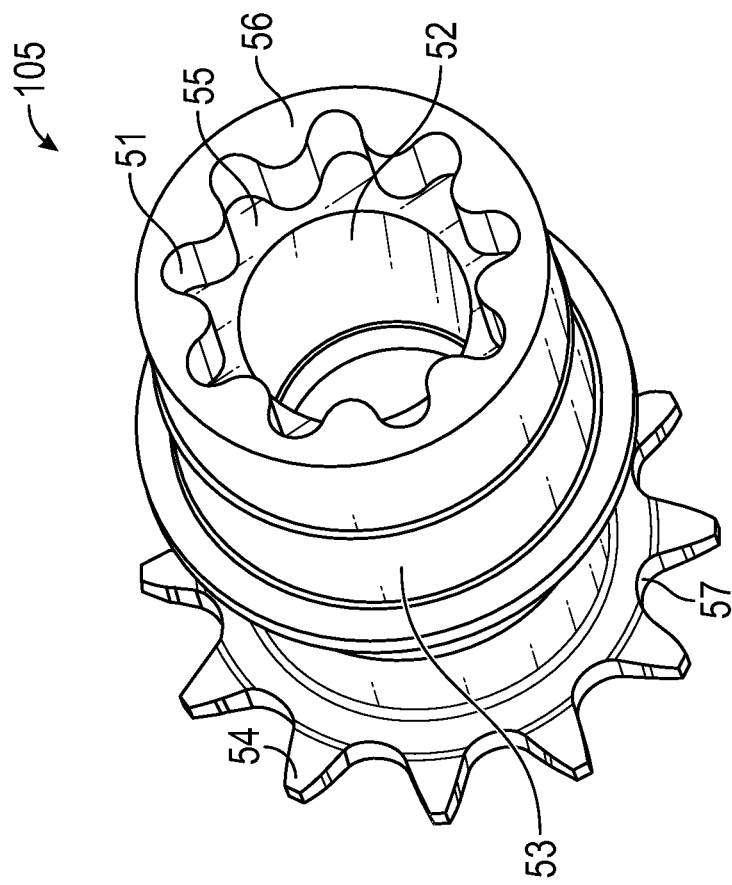
FIG. 4B is a front perspective view of the sprocket shaft of FIG. 4A.
Figure 4A:
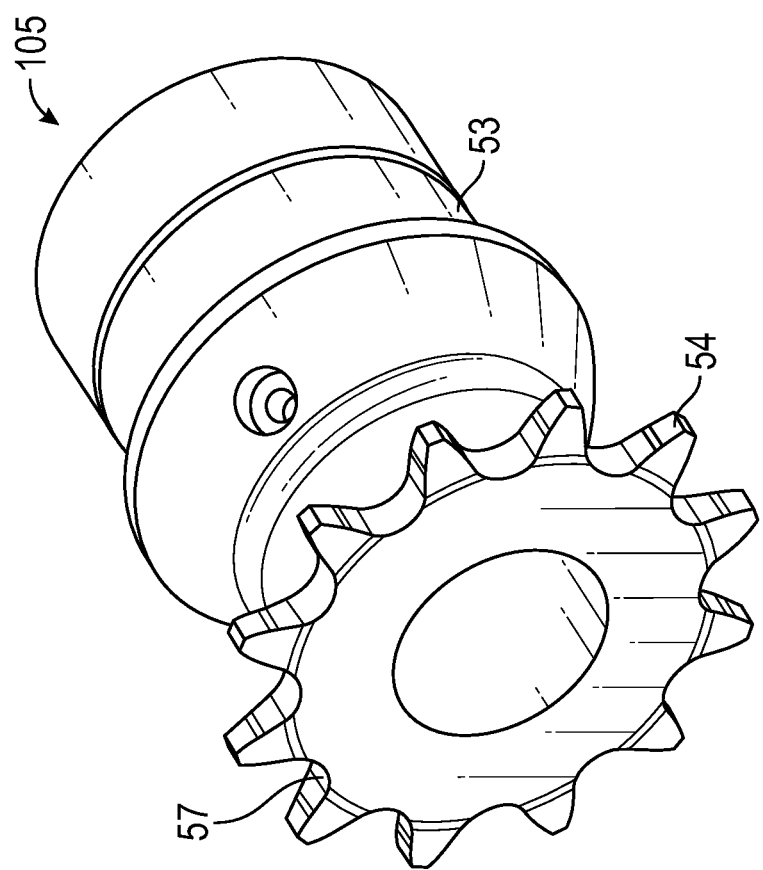
FIG. 4A is a back perspective view of a sprocket shaft of the quick disconnect system of FIG. 1A.
Figure 4D:
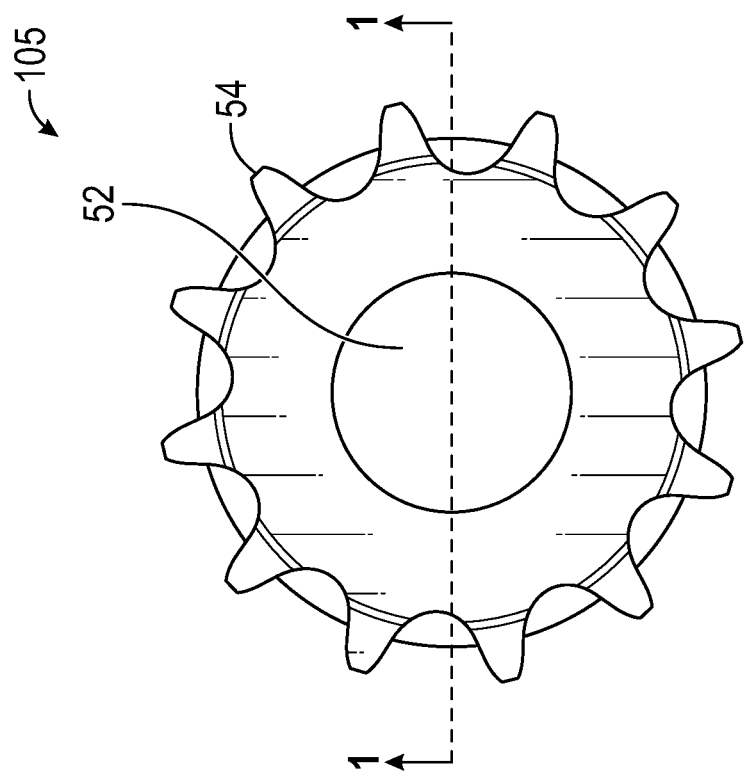
FIG. 4D is a back view of the sprocket shaft of FIG. 4A.
Figure 4C:
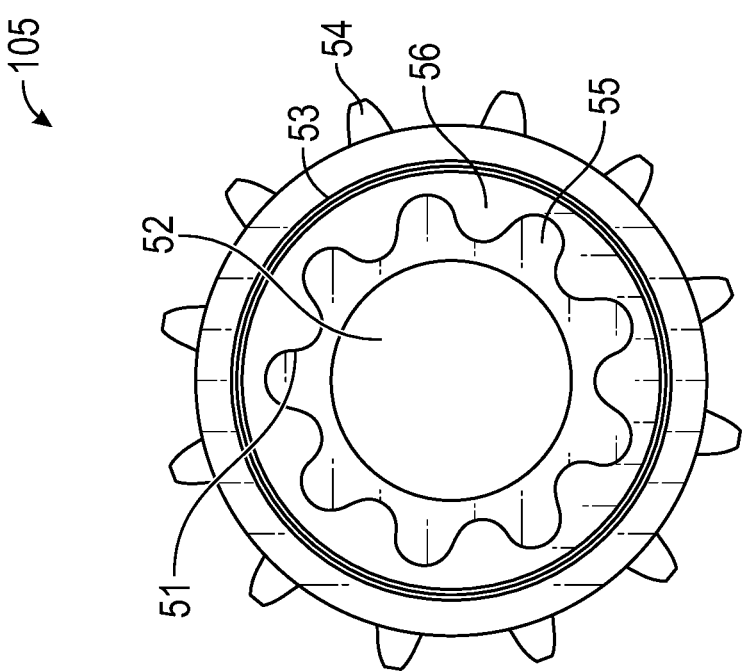
FIG. 4C is a front view of the sprocket shaft of FIG. 4A.
Figure 4F:
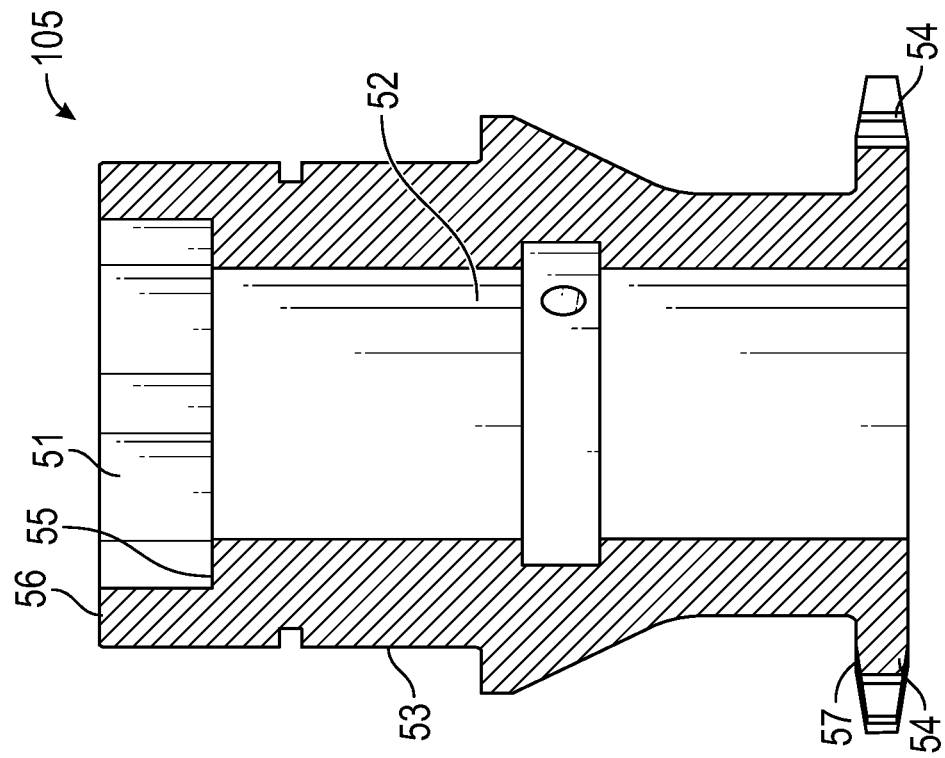
FIG. 4F is a top cross-sectional view of the sprocket shaft of FIG. 4A, taken along line 1-1 as shown in FIG. 4D.
Figure 4E:
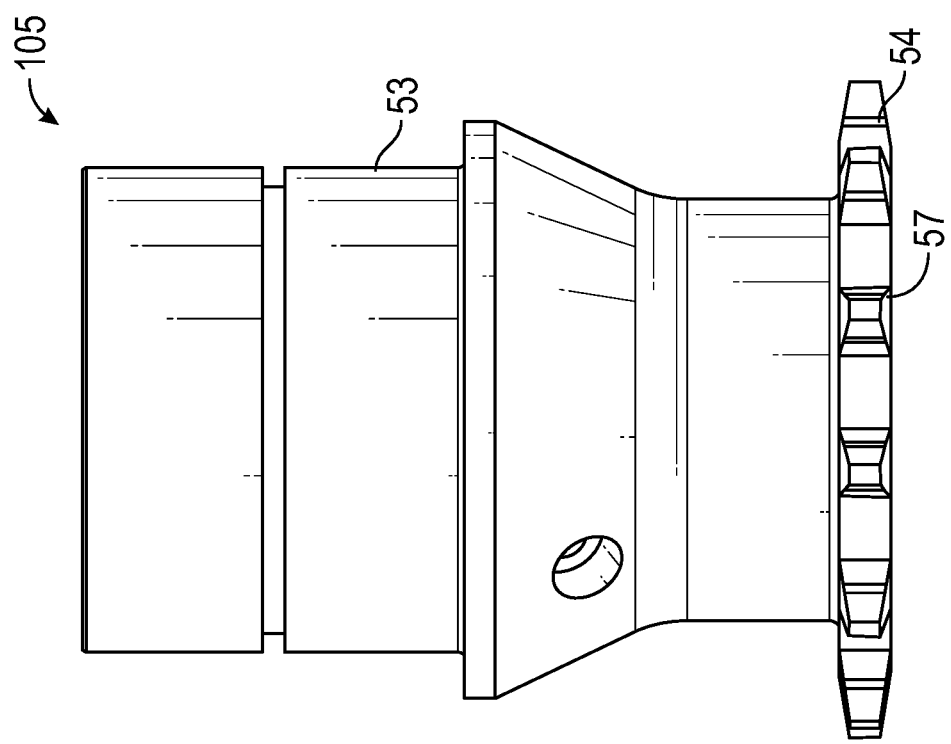
FIG. 4E is a top view of the sprocket shaft of FIG. 4A.

FIG. 4A depicts a back perspective view of a sprocket shaft 105 of the quick disconnect system 100. FIG. 4B depicts a front perspective view of the sprocket shaft 105. FIG. 4C depicts a front view of the sprocket shaft 105. FIG. 4D depicts a back view of the sprocket shaft 105. FIG. 4E depicts a top view of the sprocket shaft 105. FIG. 4F depicts a top cross-sectional view of the sprocket shaft 105, taken along line 1-1 as shown in FIG. 4D.

As shown in FIGS. 4A-E, the sprocket shaft 105 can include one or more interlocking elements 51 configured to interlock with complementary interlocking elements of the coupler 104. In some embodiments, the sprocket shaft 105 can include a bore 52. The bore 52 can receive the main shaft 106 therethrough. The sprocket shaft 105 can also include an outer surface 53. In some embodiments, the sprocket shaft 105 can include a sprocket 57 having one or more projections or teeth 54. The teeth 54 can be configured to connect to a chain, for example, to drive rear wheels of a vehicle. In some embodiments, the sprocket shaft 105 can further include a first interface 56 and a second interface 55 configured to contact interfaces of the coupler 104.

Figure 5A:
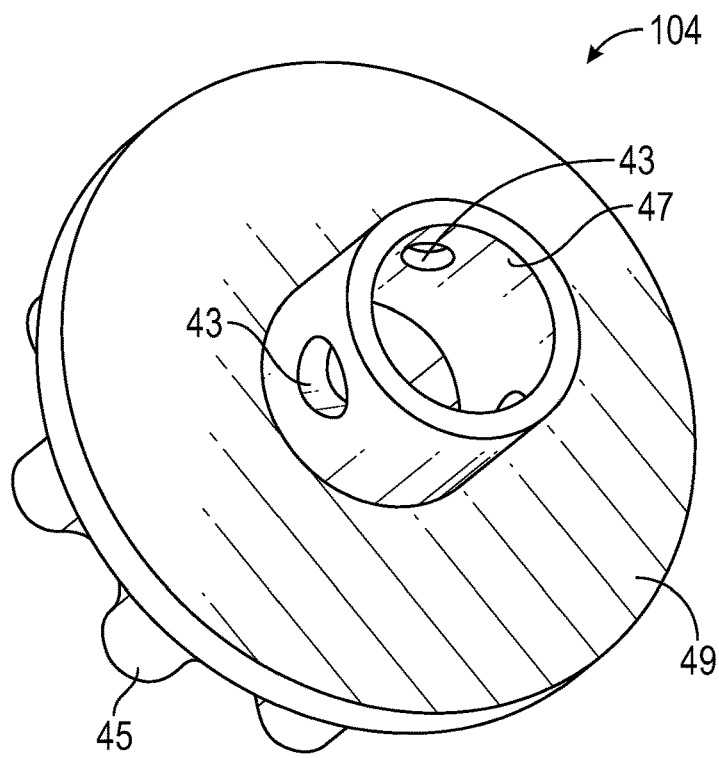
FIG. 5A is a front perspective view of a coupler of the quick disconnect system of FIG. 1A.
Figure 5B:
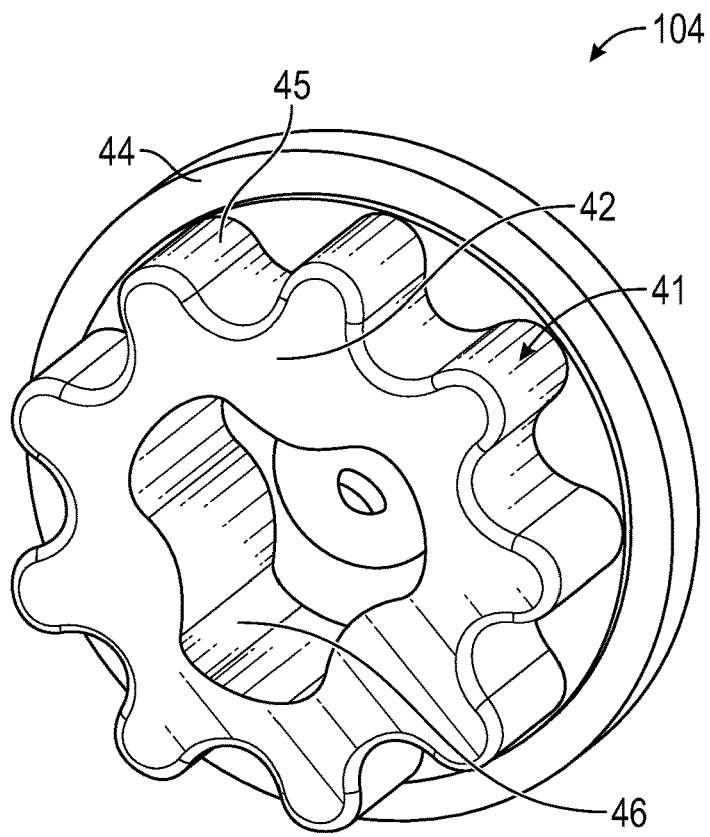
FIG. 5B is a back perspective view of the coupler of FIG. 5A.
Figure 5C:
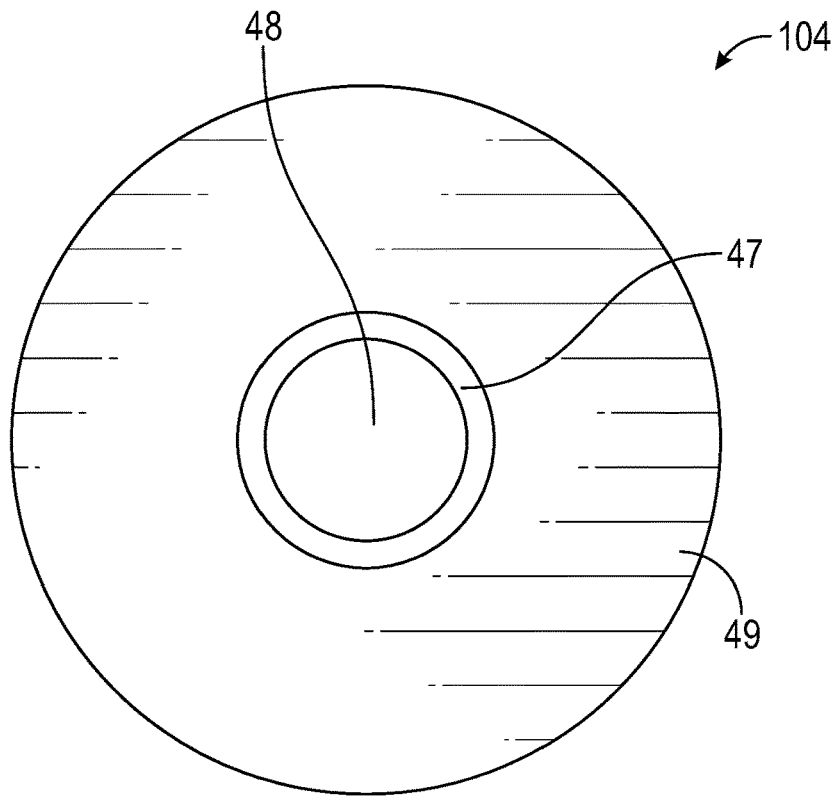
FIG. 5C is a front view of the coupler of FIG. 5A.
Figure 5D:
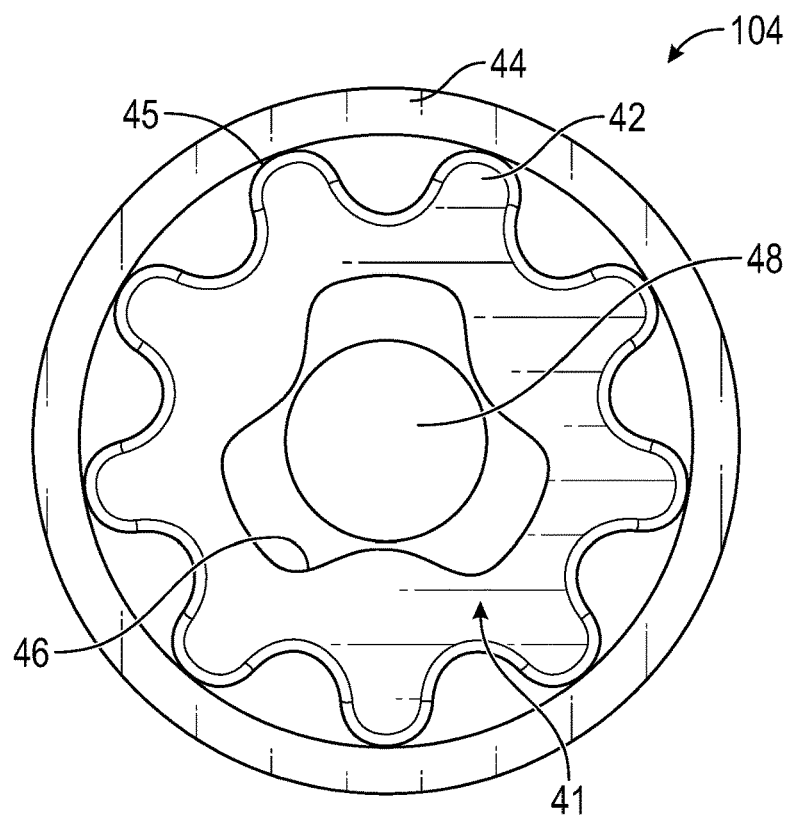
FIG. 5D is a back view of the coupler of FIG. 5A.
Figure 5E:
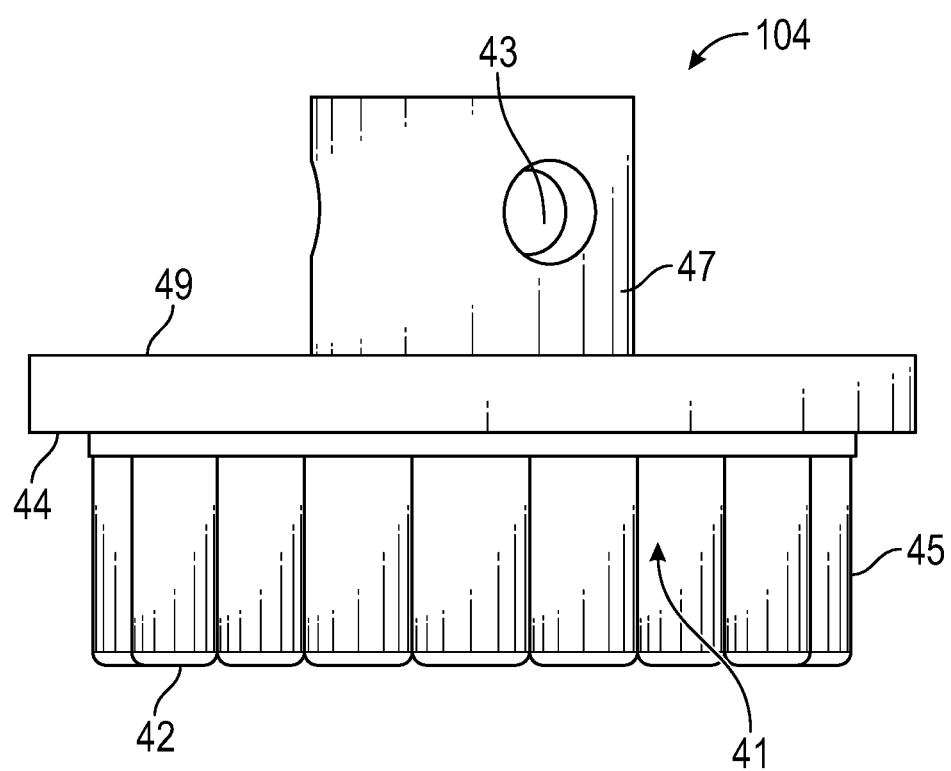
FIG. 5E is a side view of the coupler of FIG. 5A.

FIG. 5A depicts a front perspective view of a coupler 104 of the quick disconnect system 100. FIG. 5B depicts a back perspective view of the coupler 104. FIG. 5C depicts a front view of the coupler 104. FIG. 5D depicts a back view of the coupler 104. FIG. 5E depicts a side view of the coupler 104.

As shown in FIGS. 5A-5E, the coupler 104 can include a front surface 49 and a first interface 44. In some embodiments, the coupler 104 can include a neck 47 disposed on the front surface 49. The neck 47 can include one or more housing features (e.g., holes, openings, recesses) configured to house one or more engagement features. As shown in FIG. 5A, the one or more housing features can be one or more holes 43 configured to house the balls 103.

In certain embodiments, the coupler 104 can further include an interlocking body 41. The interlocking body 41 can be disposed on the first interface 44. In some embodiments, the interlocking body 41 can include one or more interlocking elements 45 configured to engage with one or more complementary interlocking elements 51 of the sprocket shaft 105. The coupler 104 can further include a second interface 42 disposed on the interlocking body 41. The coupler 104 can further include one or more interlocking elements 46 configured to engage with one or more complementary interlocking elements 63 of the main shaft 106. In some embodiments, the one or more interlocking elements 45 can be disposed on an outer surface of the interlocking body 41 and the one or more interlocking elements 46 can be disposed on an inner surface of the interlocking body 41. In some embodiments, the coupler 104 can include a bore 48 configured to receive the main shaft 106 therethrough.

Figure 6A:
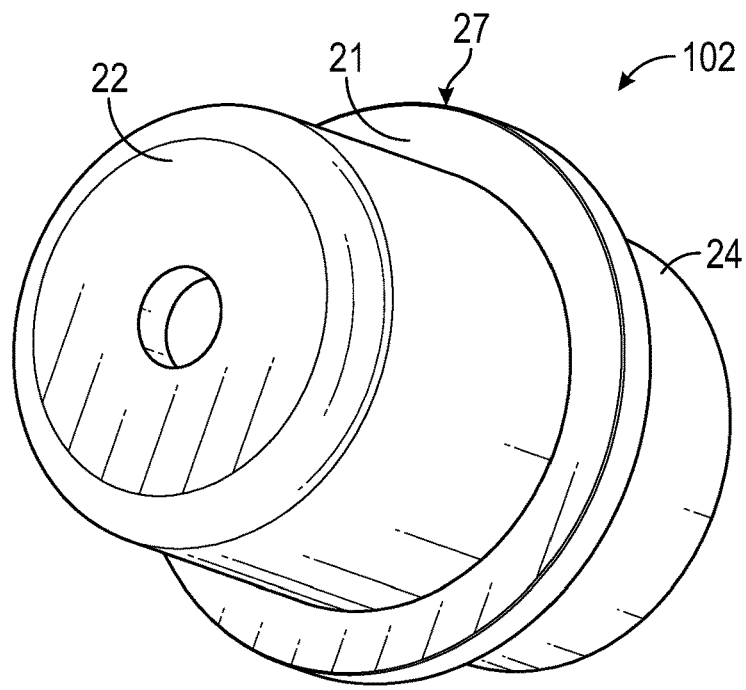
FIG. 6A is a front perspective view of a release button of the quick disconnect system of FIG. 1A.
Figure 6B:
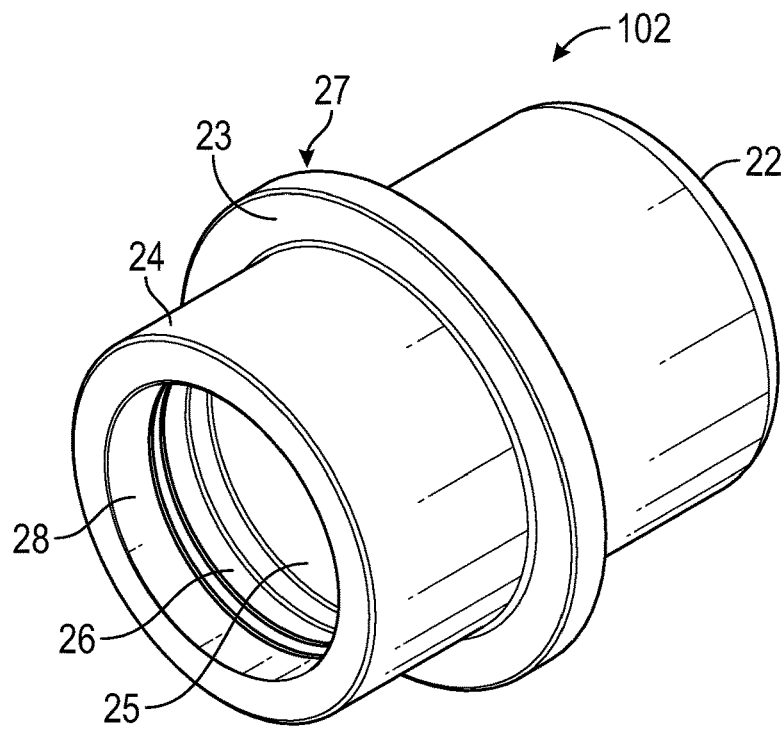
FIG. 6B is a back perspective view of the release button of FIG. 6A.
Figure 6C:
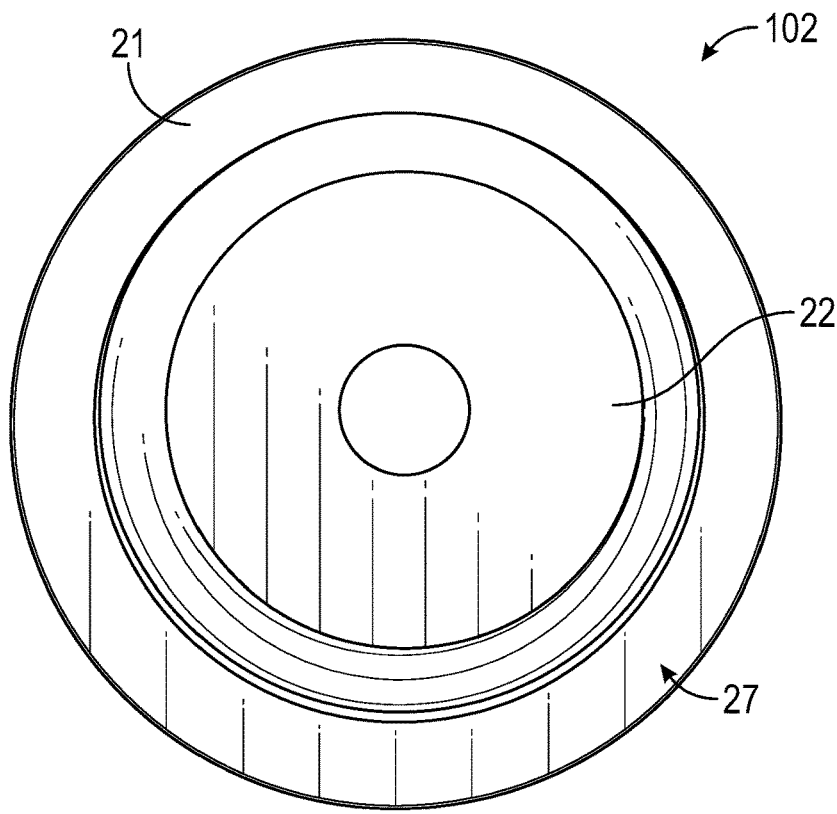
FIG. 6C is a front view of the release button of FIG. 6A.
Figure 6D:
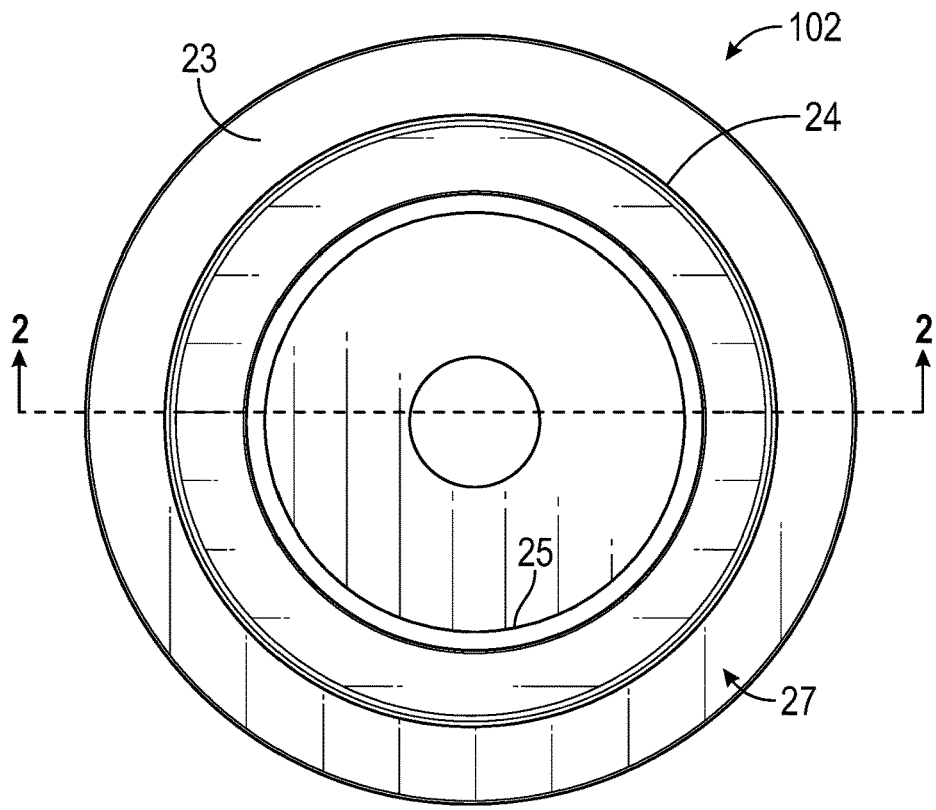
FIG. 6D is a back view of the release button of FIG. 6A.
Figure 6E:
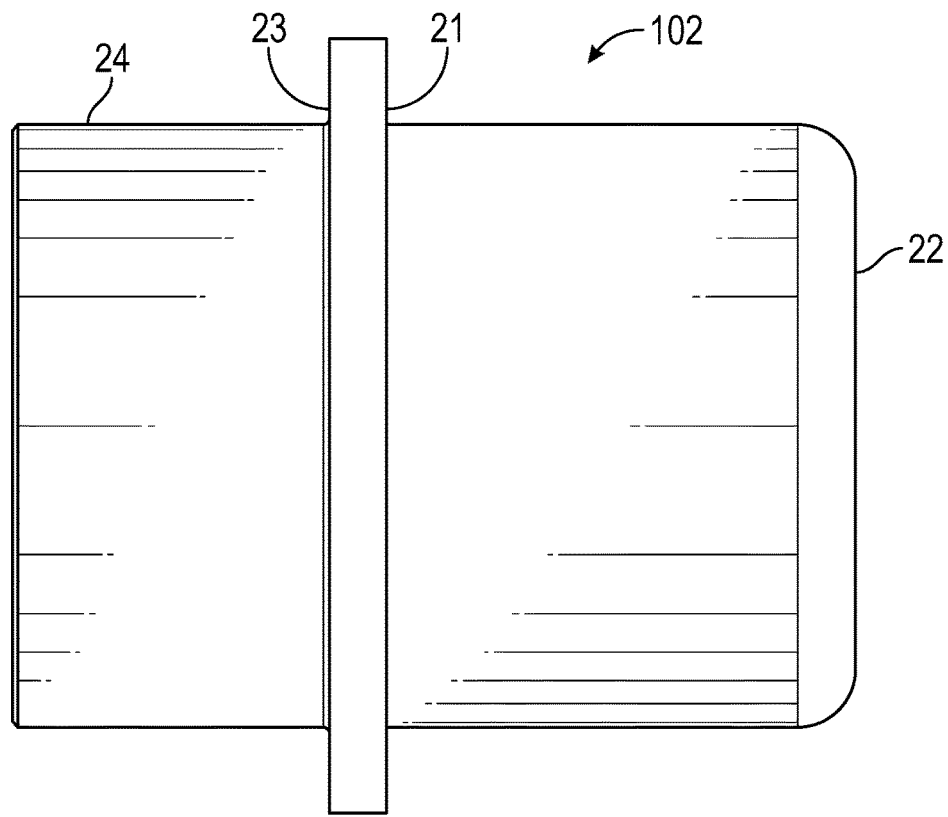
FIG. 6E is a side view of the release button of FIG. 6A.
Figure 6F:
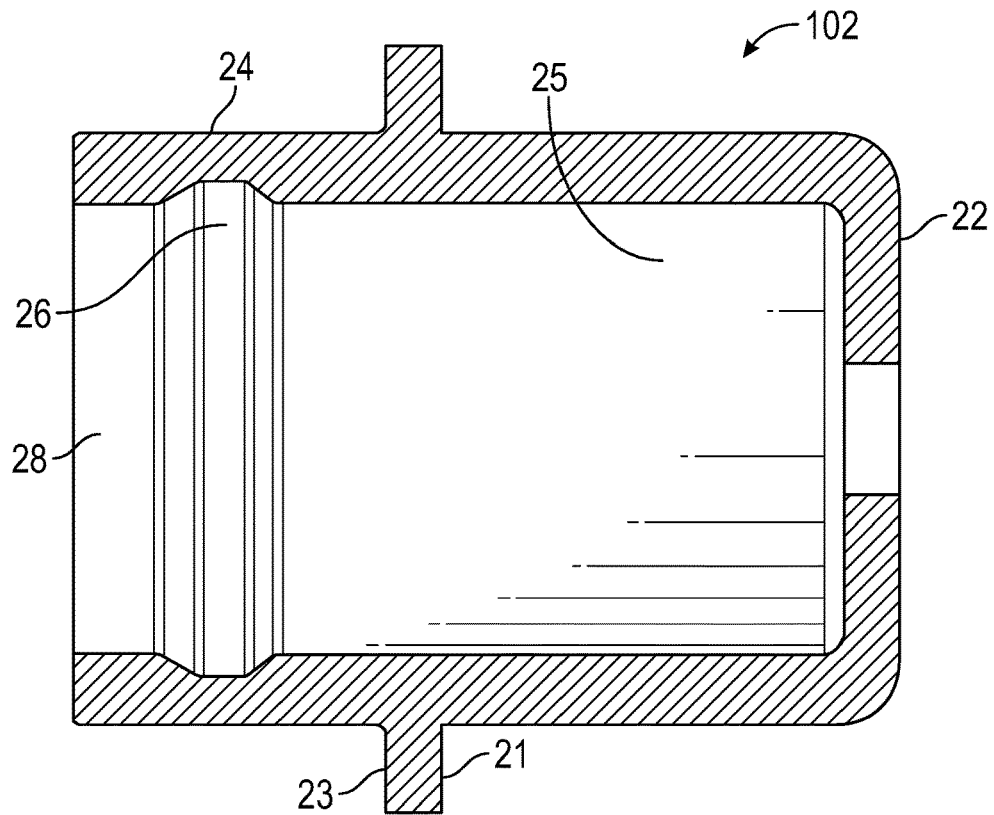
FIG. 6F is a side cross-sectional view of the release button of FIG. 6A, taken along line 2-2 as shown in FIG. 6C.

FIG. 6A depicts a front perspective view of a release button 102 of the quick disconnect system 100. FIG. 6B depicts a back perspective view of the release button 102. FIG. 6C depicts a front view of the release button 102. FIG. 6D depicts a back view of the release button 102. FIG. 6E depicts a side view of the release button 102. FIG. 6F depicts a side cross-sectional view of the release button 102, taken along line 2-2 as shown in FIG. 6D.

As shown in FIGS. 6A-6E, the release button 102 can include a front contact surface 22, an outer surface 24, and an inner surface 25. In some embodiments, the release button 102 can include a ridge 27 extending around the outer surface 24 of the release button 102. The ridge 27 can have a front interface 21 and a back interface 23. In some embodiments, the release button 102 can include a groove 26 disposed on the inner surface 25 and configured to engage the one or more balls 103. In certain embodiments, the release button 102 can further include an engagement wall or engagement surface 28. The engagement surface 28 may be a portion of the inner surface 25 proximate the groove 26 (or may be otherwise disposed on the inner surface 25 proximate the groove). The engagement surface 28 can be configured to secure the coupler 104, in cooperation with the grooves 61 and 62 of the main shaft 106, in the connected and disconnected configurations.

In certain embodiments, the release button 102 can be actuated to align the groove 26 within the release button 102 with the balls 103 to allow the balls 103 to release or disengage from the groove 61 or the groove 62 within the main shaft 106 so that the coupler 104 can be moved relative to the main shaft 106 and the sprocket shaft 105.

Figure 7B:
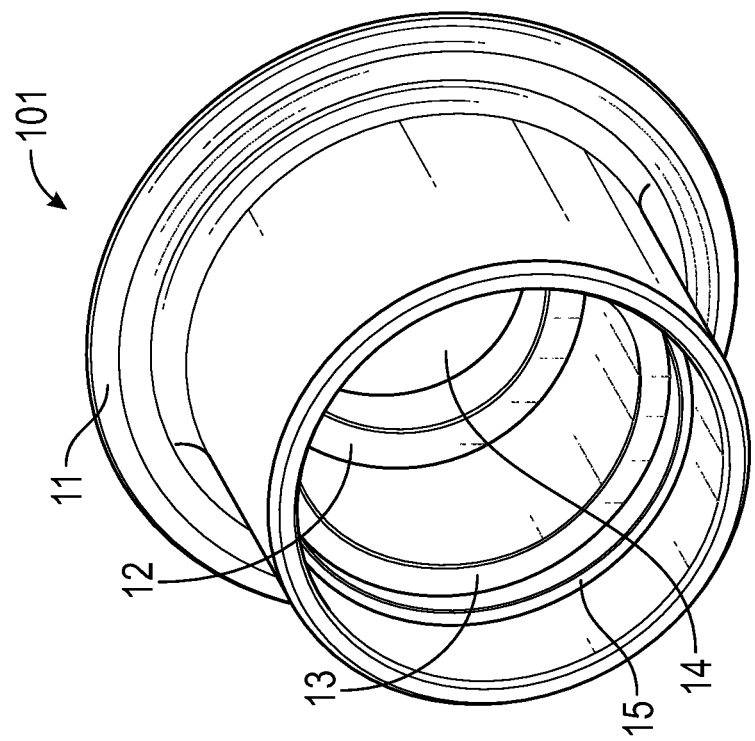
FIG. 7B is a back perspective view of the handle of FIG. 7A.
Figure 7A:
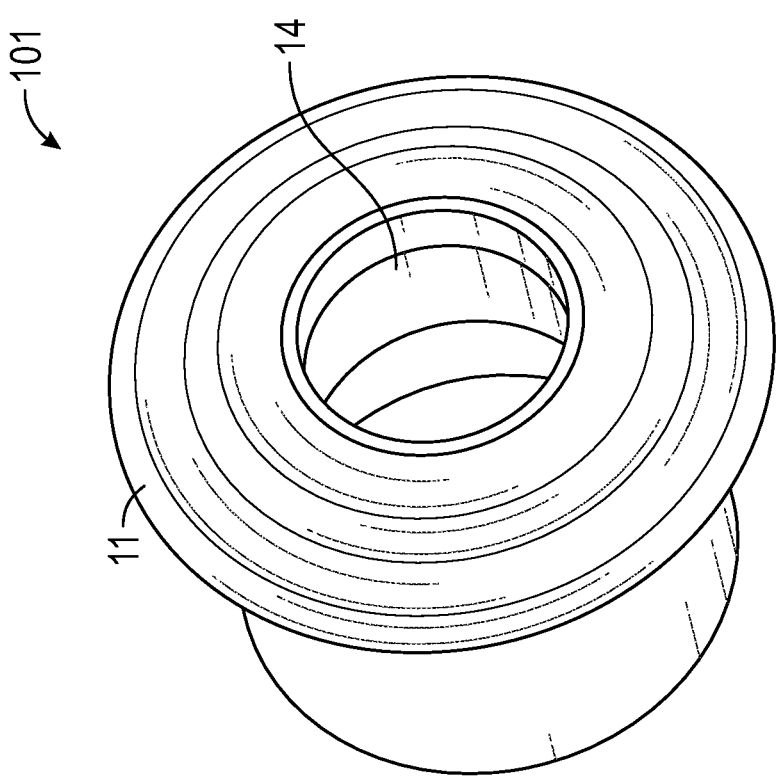
FIG. 7A is a front perspective view of a handle of the quick disconnect system in FIG. 1A.
Figure 7D:
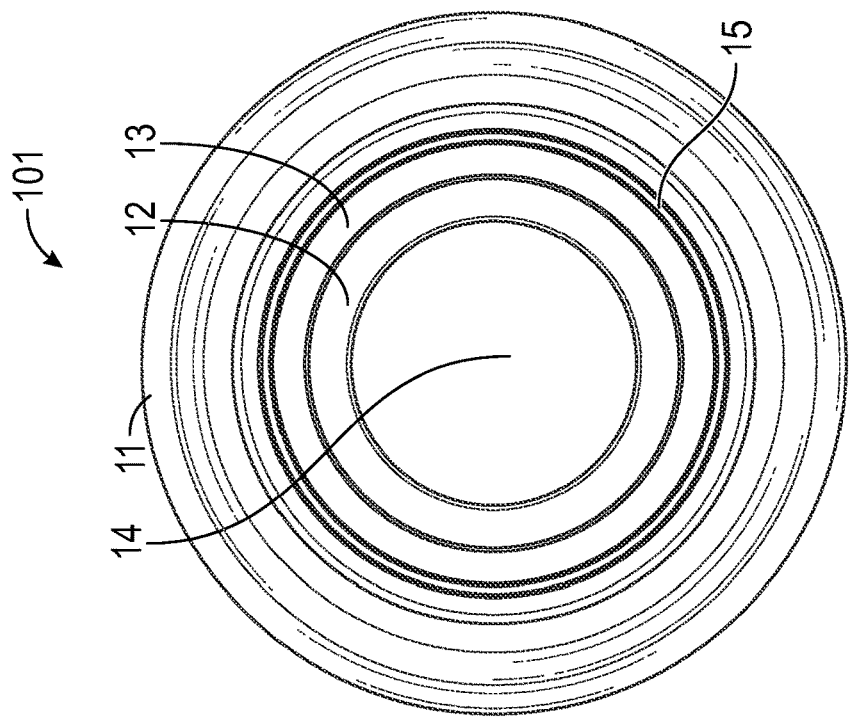
FIG. 7D is a back view of the handle of FIG. 7A.
Figure 7C:
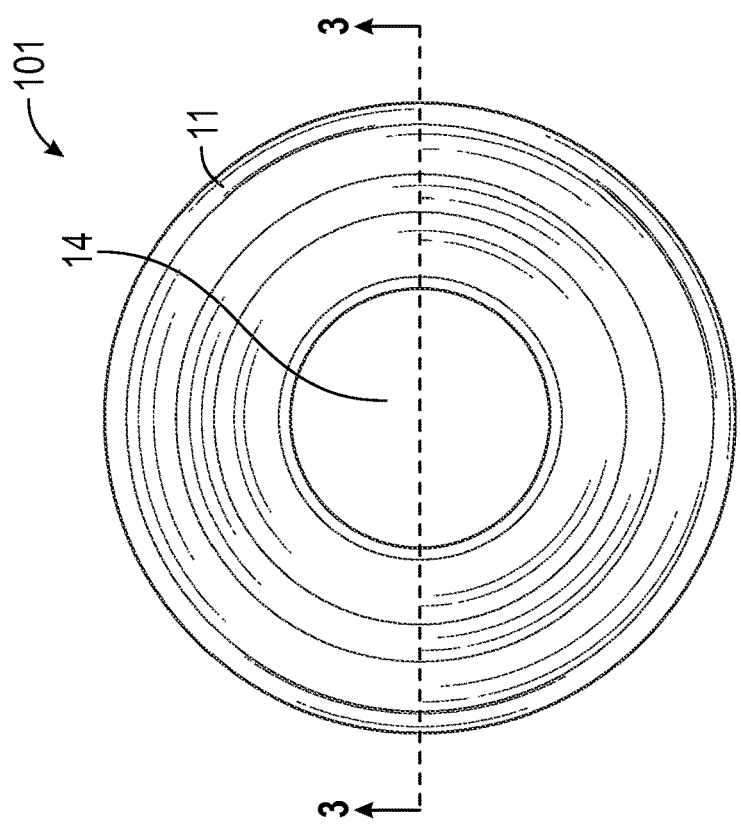
FIG. 7C is a front view of the handle of FIG. 7A.
Figure 7F:
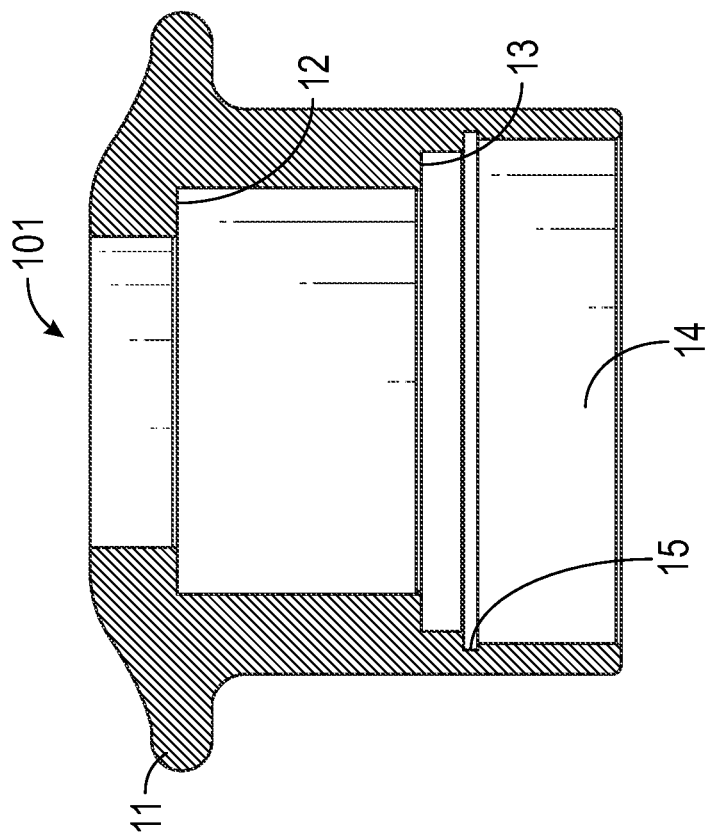
FIG. 7F is a side cross-sectional view of the handle of FIG. 7A, taken along line 3-3 as shown in FIG. 7C.
Figure 7E:
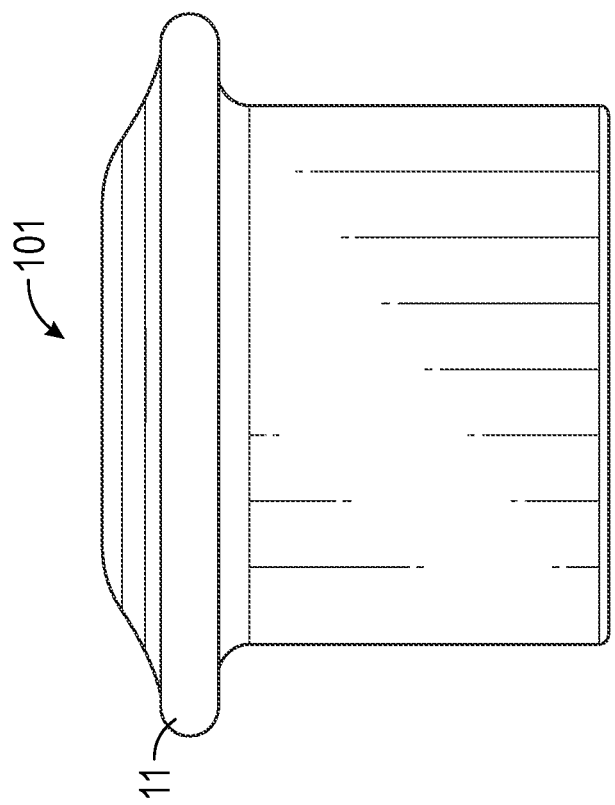
FIG. 7E is a side view of the handle of FIG. 7A.

FIG. 7A depicts a front perspective view of a handle 101 of the quick disconnect system 100. FIG. 7B depicts a back perspective view of the handle in FIG. 7A. FIG. 7C depicts a front view of the handle in FIG. 7A. FIG. 7D depicts a back view of the handle in FIG. 7A. FIG. 7E depicts a side view of the handle in FIG. 7A. FIG. 7F depicts a side cross-sectional view of the handle in FIG. 7C, taken along line 3-3 as shown in FIG. 7C.

As shown in FIGS. 7A-7B, the handle 101 can include a flange 11 configured to be grasped by a user. The handle 101 can further include an inner space 14 having a first interface 12 and a second interface 13. In some embodiments, the inner space 14 of the handle 101 can include a groove 15 configured to receive a snap ring or retaining ring 16 (as shown in FIGS. 8A-9B). The retaining ring 16 can couple the coupler 104 and the handle 101, for example, by retaining the coupler 104 within the handle 101 during movement of the handle 101 such that the handle 101 and the coupler 104 move together.

Figure 8A:
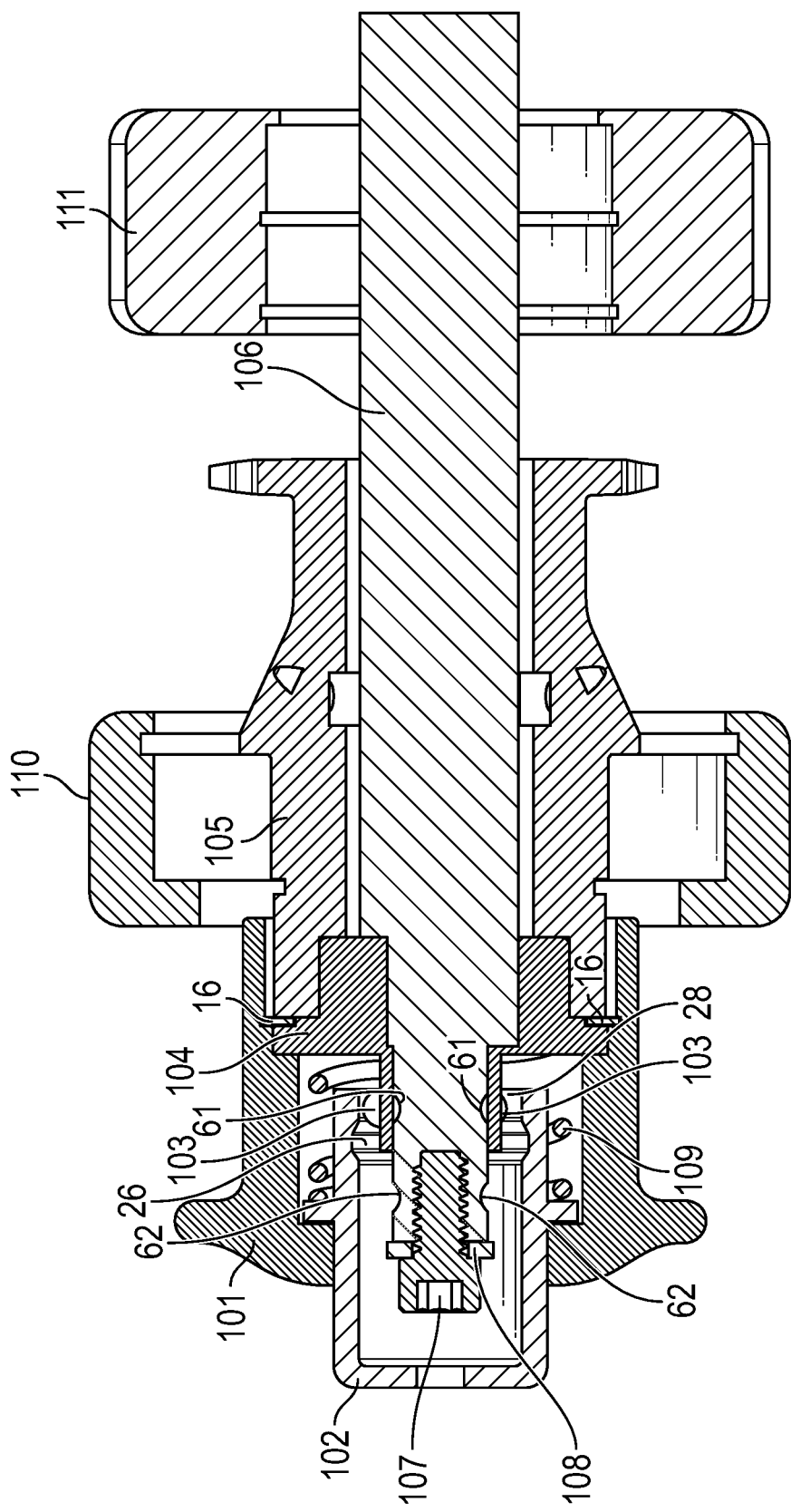
FIG. 8A is a left side cross-sectional view of the quick disconnect system of FIG. 1A, taken along line 4-4 as shown in FIG. 1E, in a connected configuration.
Figure 8B:
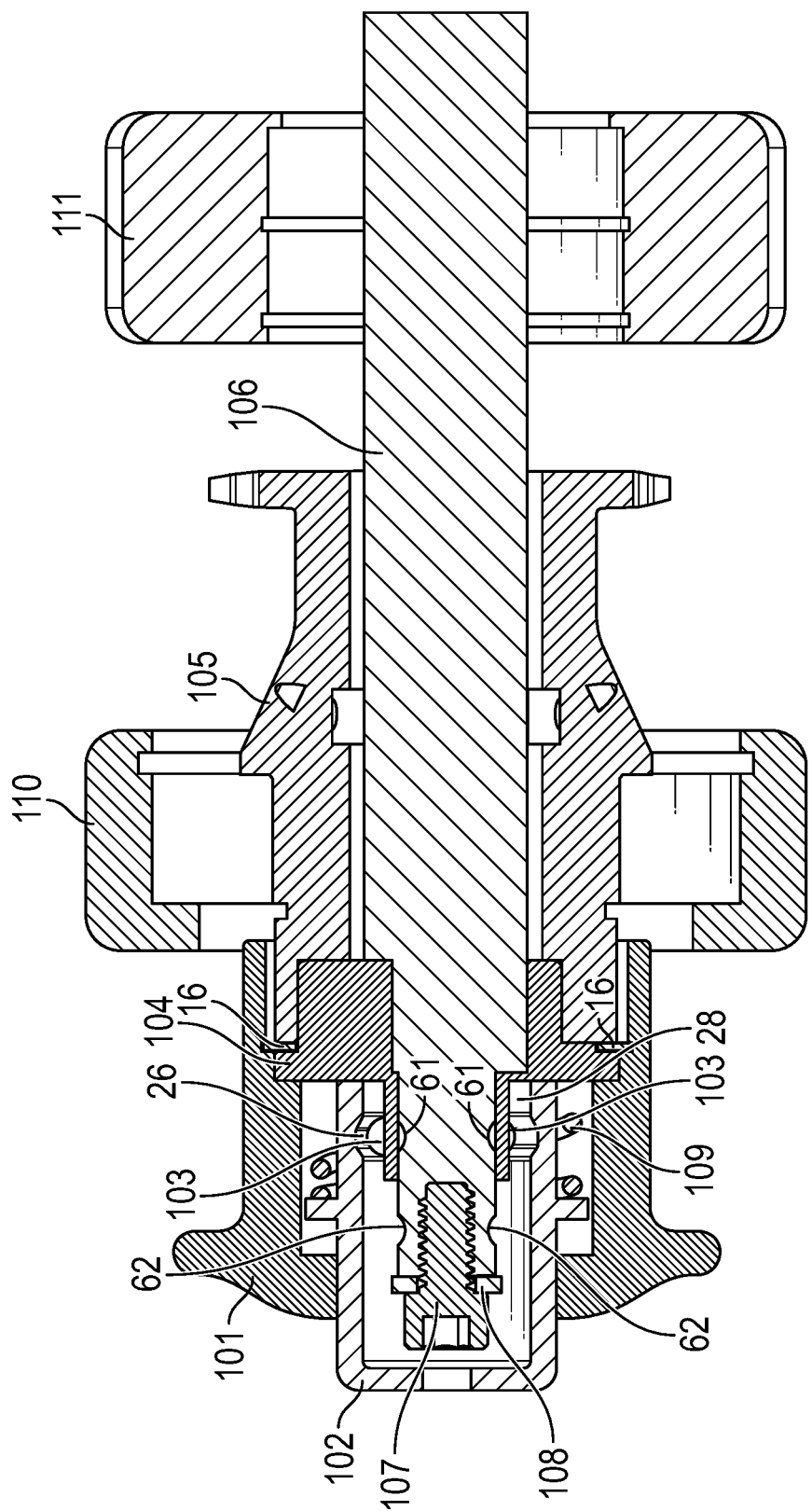
FIG. 8B is a left side cross-sectional view of the quick disconnect system of FIG. 8A in a connected configuration with the release button in an actuated state.
Figure 9A:
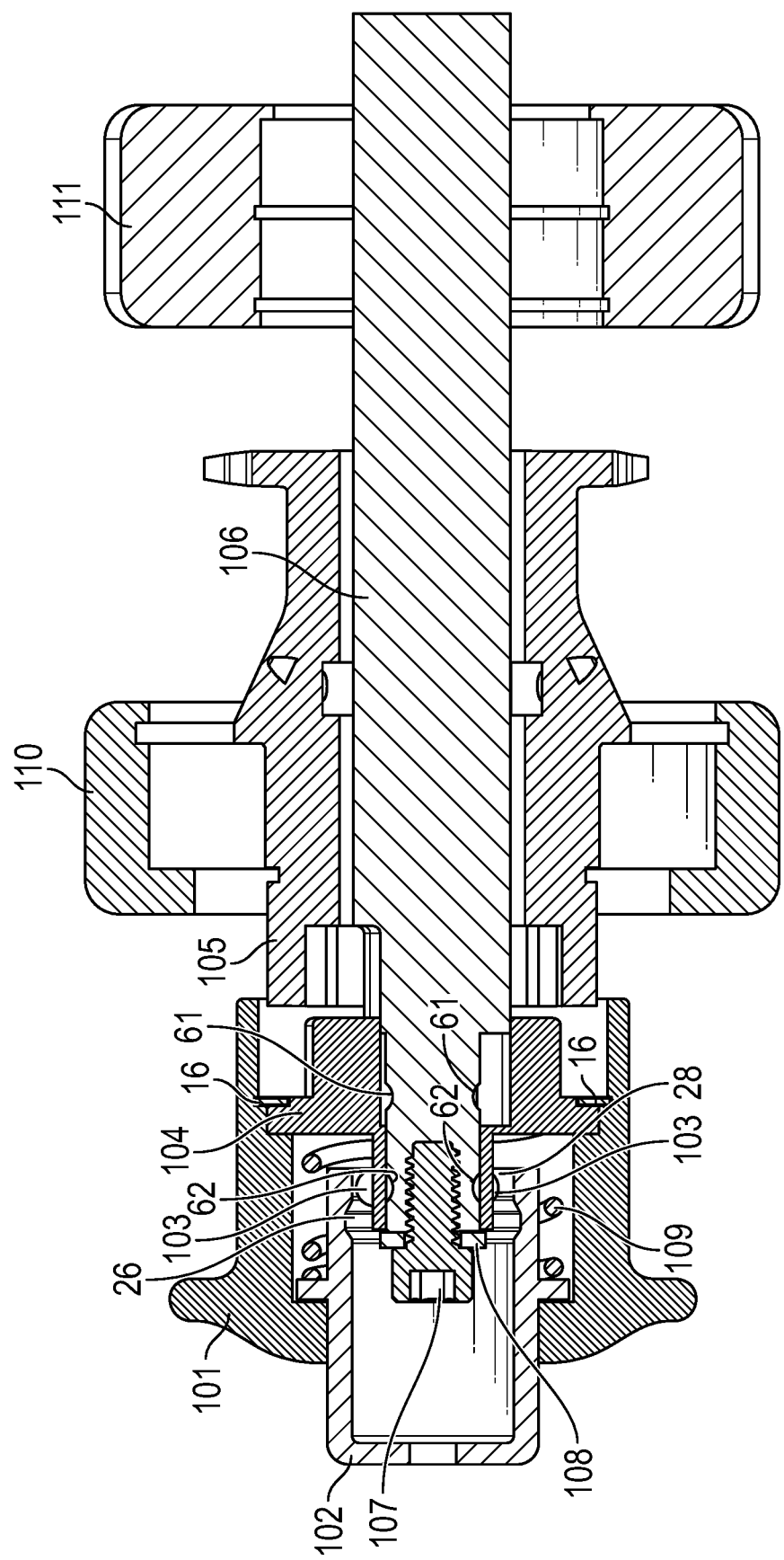
FIG. 9A is a left side cross-sectional view of the quick disconnect system of FIG. 8A in a disconnected configuration.
Figure 9B:
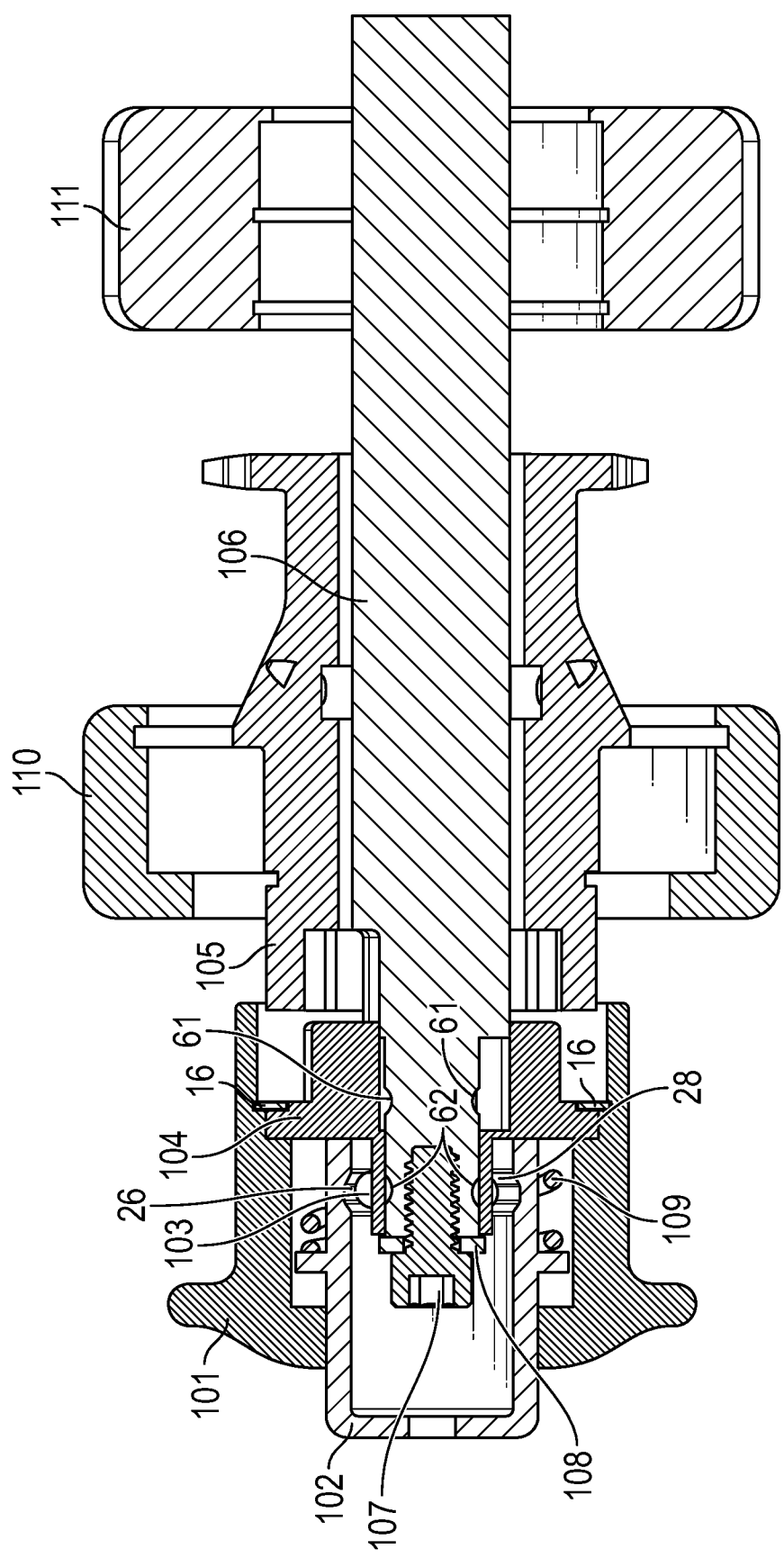
FIG. 9B is a left side cross-sectional view of the quick disconnect system of FIG. 8A in a disconnected configuration with the release button in an actuated state.

FIG. 8A depicts a left side cross-sectional view of the quick disconnect system 100, taken along plane 4-4 as shown in FIG. 1E, showing the quick disconnect system 100 in a connected configuration. FIG. 8B depicts a left side cross-sectional view of the quick disconnect system 100 showing the release button 102 in an actuated state while the coupler 104 is coupled to the sprocket shaft 105. FIG. 9A depicts a left side cross-sectional view of the quick disconnect system 100 in a disconnected configuration. FIG. 9B depicts a left side cross-sectional view of the quick disconnect system 100 showing the release button 102 in an actuated state while the coupler 104 is disconnected from the sprocket shaft 105.

As described herein, in certain embodiments, the coupler 104 of the quick disconnect system 100 can selectively connect and disconnect the main shaft 106 and the sprocket shaft 105. For example, in certain embodiments, the coupler 104 can be moved between the connected configuration as shown in FIG. 8A and the disconnected configuration, as shown in FIG. 9A.

As shown in FIG. 8A, in the connected configuration, in some embodiments, the coupler 104 connects the main shaft 106 and the sprocket shaft 105 (e.g., such that torque can be transferred between the main shaft 106 and the sprocket shaft 105). When the coupler 104 is in the connected configuration, the first interface 44 of the coupler 104 can at least partially rest against the first interface 56 of the sprocket shaft 105, and the second interface 42 of the coupler 104 can at least partially rest against the second interface 55 of the sprocket shaft 105.

In certain embodiments, the coupler 104 is rotationally locked to the main shaft 106. For example, the coupler 104 can be rotationally locked to the main shaft 106 via the coupling of interlocking elements 46 of the coupler with interlocking elements 63 of the main shaft 106. In certain embodiments, the coupler 104 is configured to slide or otherwise move into and out of the sprocket shaft 105 to connect and disconnect the main shaft 106 and the sprocket shaft 105, or in other words to move the coupler 104 between the connected configuration and the disconnected configuration.

As described herein, in certain embodiments, the coupler can house one or more engagement features (e.g., balls) configured to selectively engage and disengage corresponding engagement features (e.g., grooves or recesses) of the main shaft and/or the sprocket shaft to secure the coupler in the connected and disconnected configurations. As shown in FIG. 8A, in some embodiments, the coupler 104 can house one or more balls 103 configured to engage with the corresponding groove 61 within the main shaft 106 to secure the coupler 104 in the connected configuration. In certain embodiments, the one or more balls 103 can be secured between the engagement surface 28 of the release button 102 and the groove 61 within the main shaft 106 in the connected configuration. In certain embodiments, the coupler 104 can house six balls 103 (and/or other engagement features) configured to engage the corresponding grooves 61 and 62 of the main shaft 106. In other embodiments, the coupler may house one, two, three, four, five, six, seven, or any other suitable number of balls (and/or other engagement features).

FIG. 8A depicts the balls 103 within the first groove 61 of the main shaft 106 and against the engagement surface 28 of the release button 102, securing the coupler 104 in the connected configuration. As shown in FIG. 8A, a portion of the coupler 104 is positioned within the sprocket shaft 105 such that rotation of the coupler 104 due to rotation of the main shaft 106 will cause rotation of the sprocket shaft 105. For example, rotation of the main shaft 106 can cause rotation of the coupler 104 via the coupling between the interlocking elements 46 of the coupler and the interlocking elements 63 of the main shaft 106. Rotation of the coupler 104 can cause rotation of the sprocket shaft 105 via the coupling between the interlocking elements 45 of the coupler and the interlocking elements 51 of the sprocket shaft 105.

As shown in FIG. 8A, the release button 102 can be positioned within a handle 101. The handle 101 can house the release button 102 and the coupler 104. When the release button 102 is in the unactuated position, the front interface 21 of the release button 102 can at least partially rest against the first interface 12 disposed on the inner space 14 of the handle 101. The handle 101 can also provide a ridge 11 for grasping by a user, and can be manipulated by the user to move the coupler 104 between the connected configuration and the disconnected configuration when the release button 102 is actuated, as described further herein.

The quick disconnect system 100 can allow a user to slide the coupler 104 in and out of the sprocket shaft 105 by actuating the release button 102 and moving the handle 101, which can allow the user to connect or disconnect the main shaft 106 and the sprocket shaft 105.

In some embodiments, the second interface 13 of the handle 101 can at least partially contact the front surface 49 of the coupler 104. In some embodiments, as shown in FIG. 8A, the retaining ring 16 can be positioned in a space at least partially defined by the groove 15 of the handle 101 and the first interface 44 of the coupler 104. The coupler 104 can be retained or secured within the handle 101 so as to move with the handle 101 due to the contact between the second interface 13 of the handle 101 and the front surface 49 of the coupler 104 and due to the retaining ring 16. The contact between the second interface 13 of the handle 101 and the front surface 49 of the coupler 104 can prevent movement of the coupler 104 relative to the handle 101 in a direction towards the button 102. The retaining ring 16 can prevent movement of the coupler 104 relative to the handle 101 in a direction towards the bearing block 101. In some embodiments, the coupler 104 and handle 101 may be coupled via an interference fit, which may prevent or restrict relative movement between the coupler 104 and handle 101.

FIG. 8B depicts a left side cross-sectional view of the quick disconnect system 100 in a connected configuration with the release button 102 being actuated (e.g., pushed inwardly within the handle 101). In certain embodiments, the release button 102 can be actuated, for example by pressing on the front contact surface 22, by a user to move the coupler 104 from the connected configuration to the disconnected configuration. For example, in certain embodiments, when the coupler 104 is in the connected configuration, the release button 102 can be actuated to release or disengage the balls 103 from the groove 61 of the main shaft 106 to allow the coupler 104 to move relative to the main shaft 106 and the sprocket shaft 105 (e.g., from the connected configuration to the disconnected configuration).

When the release button 102 is actuated, a user can manipulate the handle 101 to move the coupler 104 from the connected configuration in FIG. 8A to the disconnected configuration in FIG. 9A. When the coupler 104 is in the connected configuration, as shown in FIG. 8A, the release button 102 can be actuated to cause the groove 26 of the release button 102 to align with the balls 103, as shown in FIG. 8B, to allow the balls 103 to disengage from the first groove 61 of the main shaft 106. When the balls 103 are disengaged from the first groove 61 of the main shaft 106, as shown in FIG. 8B, the handle 101 can be moved away from the sprocket shaft 105 to cause the coupler 104 to disengage from the sprocket shaft 105 and to cause the balls 103 to axially align with the second groove 62 of the main shaft 106. After the coupler 104 is moved away from the sprocket shaft 105 and the balls 103 are axially aligned with the second groove 62, the release button 102 can be released, which can cause the balls 103 to be secured within the second groove 62. The balls 103 may be secured within the groove 62 by the inside diameter of the release button 102 (e.g., by the engagement surface 28), as shown in FIG. 9A.

As shown in FIG. 9A, in the disconnected configuration, the coupler 104 does not connect the main shaft 106 and the sprocket shaft 105 (e.g., such that the main shaft 106 can rotate independently with respect to the sprocket shaft 105). In the disconnected configuration, the coupler 104 is disengaged from the sprocket shaft 105 such that rotation of the coupler 104 via the main shaft 106 will not result in rotation of the sprocket shaft 105, and vice versa. The one or more balls 103 can be configured to engage with the groove 62 within the main shaft 106 to secure the coupler 104 in the disconnected configuration. In certain embodiments, the one or more balls 103 can be secured between the engagement surface 28 of the release button 102 and the groove 62 within the main shaft 106 in the disconnected configuration. In the disconnected configuration, the sprocket shaft 105 can rotate about the main shaft 106 via sleeve bearings.

FIG. 9B depicts a left side cross-sectional view of the quick disconnect system 100 in a disconnected configuration with the release button 102 being actuated (e.g., pushed inwardly within the handle 101). In certain embodiments, the release button 102 can be actuated by a user to move the coupler 104 from the disconnected configuration to the connected configuration. As shown in FIG. 9B, when the coupler 104 is in the disconnected configuration, the release button 102 can be actuated to release or disengage the balls 103 from the groove 62 of the main shaft 106 to allow the coupler 104 to move relative to the main shaft 106 and the sprocket shaft 105 (e.g., from the disconnected configuration to the connection configuration).

When the release button 102 is actuated, a user can manipulate the handle 101 to move the coupler 104 from the disconnected configuration as shown in FIG. 9A to the connected configuration as shown in FIG. 8A. When the coupler 104 is in the disconnected configuration, as shown in FIG. 9A, the release button 102 can be actuated to cause the groove 26 of the release button 102 to align with the balls 103, as shown in FIG. 9B to allow the balls 103 to disengage from the second groove 62 of the main shaft 106. When the balls 103 are disengaged from the second groove 62 of the main shaft 106, as shown in FIG. 9B, the handle 101 can be moved towards the sprocket shaft 105 to cause the coupler 104 to move into the sprocket shaft 105 and to cause the balls 103 to axially align with the first groove 61 of the main shaft 106. After the coupler 104 is moved into the sprocket shaft 105 and the balls 103 are axially aligned with the first groove 61, the release button 102 can be released, which can cause the balls 103 to be secured within the first groove 61 by the inside diameter of the release button 102 (e.g., by the engagement surface 28), as shown in FIG. 8A.

In certain embodiments, a spring 109 can be positioned within the handle 101 to cause the release button 102 to return to an unactuated position after release by a user. In some embodiments, the spring 109 can be positioned between the back interface 23 of the ridge 27 of the release button 102 and the front surface 49 of the coupler 104. As shown in FIGS. 8B and 9B, the spring 109 can be compressed when the release button 102 is actuated.

Figure 10A:
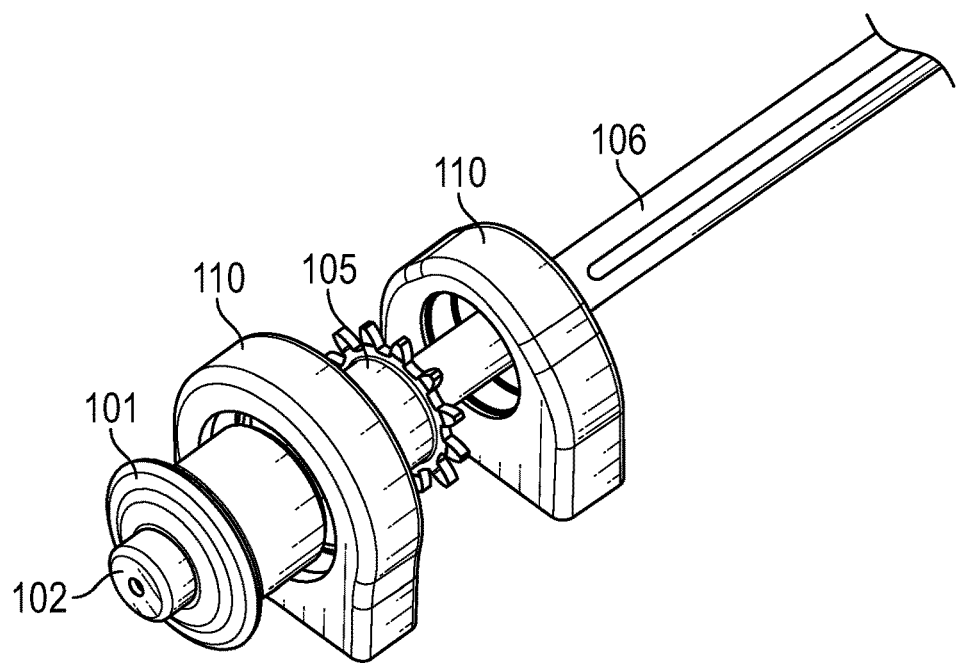
FIG. 10A is a front perspective view of a portion of the quick disconnect system of FIG. 1A.
Figure 10B:
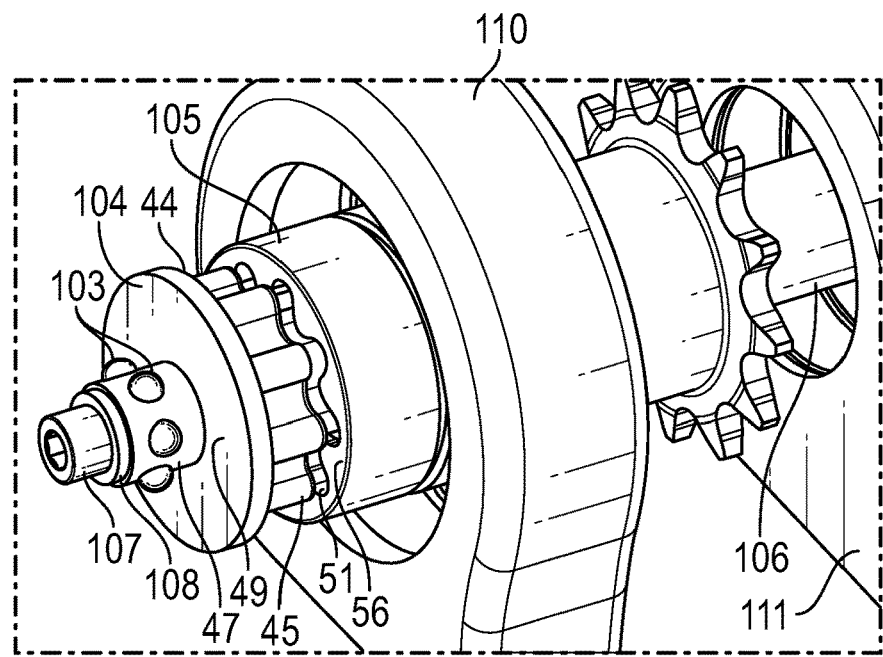
FIG. 10B is an enlarged view of a portion of the quick disconnect system of FIG. 10A in a disconnected configuration without the release button, the handle, and the spring.

FIG. 10A depicts a front perspective view of the quick disconnect system in FIG. 1A. FIG. 10B depicts an enlarged view of the quick disconnect system 100 in a disconnected configuration without the release button 102, the handle 101, and the spring 109.

As shown in FIG. 10B, the coupler 104 can have one or more interlocking elements 45 configured to engage with one or more complementary interlocking elements 51 of the sprocket shaft 105. The complementary interlocking elements 45 of the coupler 104 and interlocking elements 51 of the sprocket shaft 105 can be shaped to allow for longitudinal sliding of the coupler 104 and sprocket shaft 105 relative to one another with little or no rotation. For example, the interlocking elements 45 and interlocking elements 51 (and/or any of the complementary sets of interlocking elements described herein) can include interlocking teeth, complementary protrusions and recesses, and/or other suitable complementary male and female shapes. Alternative shapes, such as a spline or any other interlocking shape capable of longitudinally sliding with little or no rotation may also be used in certain embodiments. In certain embodiments, the complementary interlocking elements 45 and 51 (and/or any of the complementary sets of interlocking elements described herein) may be tapered to form a tighter fit as the complementary interlocking elements 45 and 51 (and/or any of the complementary sets of interlocking elements described herein) are slid together.

Figure 10C:
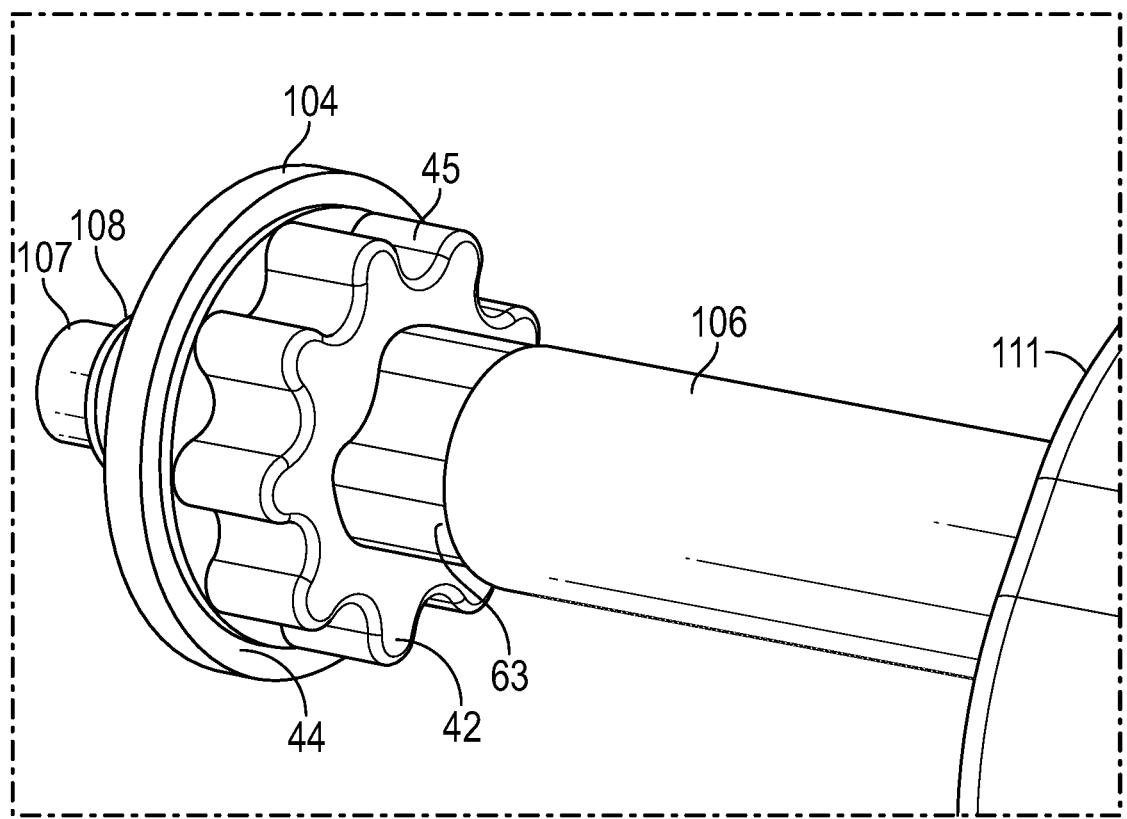
FIG. 10C is an enlarged back perspective view of a portion of the quick disconnect system of FIG. 10A in a disconnected configuration without the release button, the handle, the spring, and the sprocket shaft.

FIG. 10C depicts an enlarged back perspective of the quick disconnect system 100 in a disconnected configuration without the release button 102, the handle 101, the spring 109, and the sprocket shaft 105.

As shown in FIG. 10C, in certain embodiments, the coupler 104 can have one or more interlocking elements 46 configured to engage with one or more complementary interlocking elements 63 of the main shaft 106. The complementary interlocking elements 46 of the coupler 104 and interlocking elements 63 of the main shaft 106 can be shaped to allow for longitudinal sliding of the coupler 104 and main shaft 106 relative to one another with little or no rotation. For example, the interlocking elements 46 and interlocking elements 63 can include interlocking teeth, complementary protrusions and recesses, and/or other suitable complementary male and female shapes. Alternative shapes, such as a spline or any other interlocking shape capable of longitudinally sliding with little or no rotation may also be used in certain embodiments. In certain embodiments, the complementary interlocking elements 46 and 63 may be tapered to form a tighter fit as the complementary interlocking elements 46 and 63 are slid together.

Figure 11:
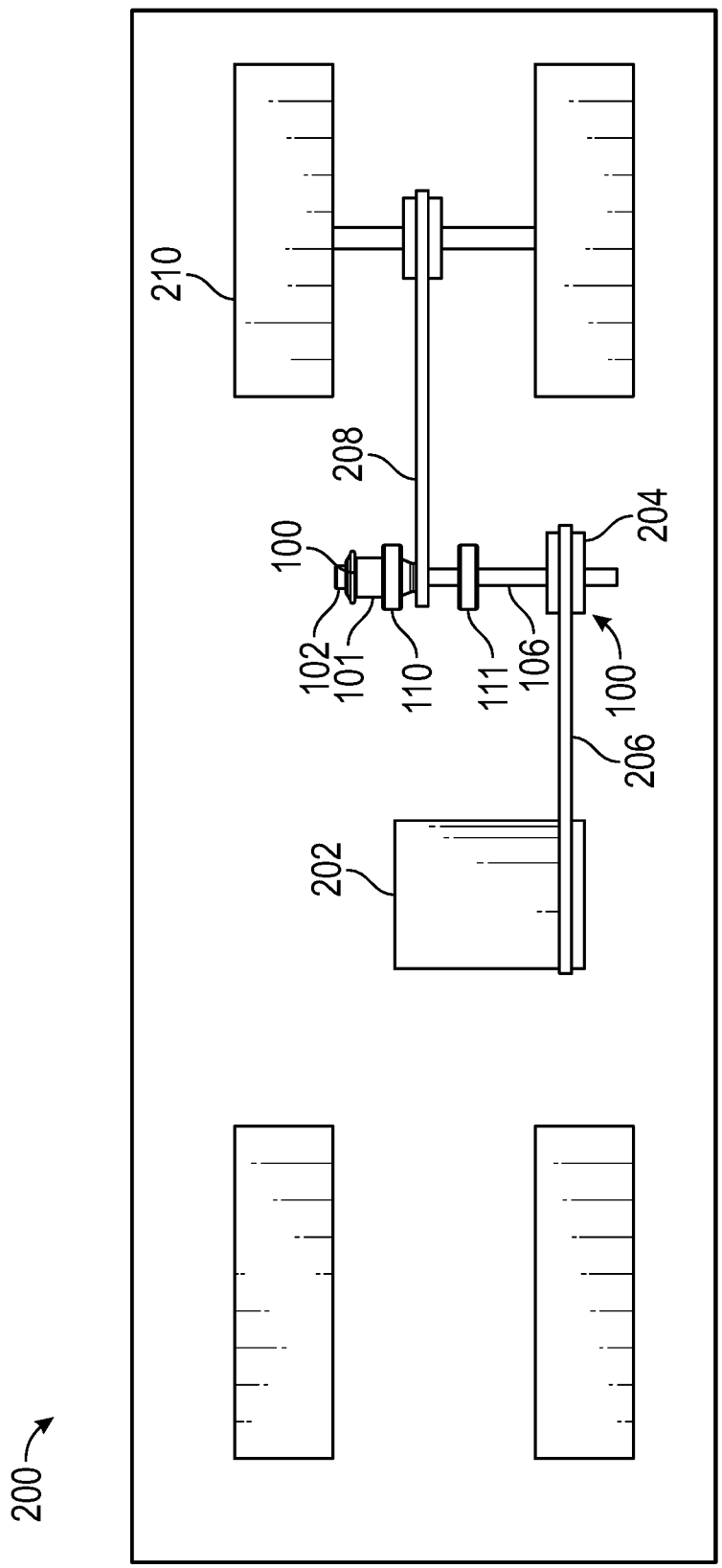
FIG. 11 is a schematic view of a vehicle including the quick disconnect system of FIG. 1A.

FIG. 11 depicts an example of the quick disconnect system 100 installed within a vehicle 200. The vehicle 200 may be, for example, a junior dragster. As shown in FIG. 11, the main shaft 106 may be coupled to an engine 202 of the vehicle 200, so that the engine 202 can drive rotation of the main shaft 106. For example, the main shaft 106 can connect (temporarily or permanently) to a pulley 204 coupled via a belt 206 to the engine 202 of the vehicle, allowing the engine to drive the main shaft 106.

As shown in FIG. 11, the sprocket shaft 105 can be coupled to the rear wheels 210 of the vehicle so that rotation of the sprocket shaft 105 can drive rotation of the wheels 210. For example, the sprocket shaft 105 can couple to the rear wheels 210 via a chain 208. For example, as described herein, the sprocket shaft 105 can include a sprocket 57 having teeth 54 that can couple to the chain 208 to drive movement thereof. As described herein, the sprocket shaft 105 can be selectively connected to and disconnected from the main shaft 106. When the sprocket shaft is selectively connected to the main shaft 106, the engine 202 can drive rotation of the main shaft 106 to cause the main shaft 106 to rotate the sprocket shaft 105 so that the sprocket shaft drives rotation of the rear wheels 210. When the sprocket shaft 105 is disconnected from the main shaft 106, the sprocket shaft 105 and main shaft 106 can rotate independently of one another. When the sprocket shaft 105 is disconnected from the main shaft, the engine 202 can be disconnected from the rear wheels 210, or in other words, the engine-driven pulley 204 can be disconnected from the sprocket 57 that turns the chain 208 that drives the rear wheels 210. When the sprocket shaft 105 is disconnected form the main shaft 106, the rear wheels 210 can roll freely, or at least more freely than when the sprocket shaft 105 and main shaft 106 are connected.

The embodiments described herein are exemplary. Modifications, rearrangements, substitute processes, alternative elements, etc. may be made to these embodiments and still be encompassed within the teachings set forth herein.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations.

While the above detailed description has shown, described, and pointed out novel features as applied to illustrative embodiments, it will be understood that various omissions, substitutions, and changes in the form and details of the devices illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A quick disconnect system, comprising:
   a main shaft;
   a sprocket shaft mounted around the main shaft;
   a coupler configured to move relative to the main shaft and the sprocket shaft between a connected configuration wherein the coupler is configured to connect the main shaft to the sprocket shaft such that torque is transferred between the main shaft and the sprocket shaft, and a disconnected configuration wherein the main shaft is configured to rotate relative to the sprocket shaft; and
   a release button configured to be actuated to release the coupler from the connected configuration and configured to be actuated to release the coupler from the disconnected configuration.

2. The quick disconnect system of claim 1, further comprising one or more engagement features configured to be housed by the coupler and to engage the main shaft.

3. The quick disconnect system of claim 2, wherein the main shaft comprises a first groove and a second groove configured to receive the one or more engagement features.

4. The quick disconnect system of claim 3, wherein in the connected configuration, the one or more engagement features are positioned within the first groove of the main shaft; and wherein in the disconnected configuration, the one or more engagement features are positioned within the second groove of the main shaft.

5. The quick disconnect system of claim 4, wherein the one or more engagement features comprise one or more balls.

6. The quick disconnect system of claim 1, further comprising a handle configured to move the coupler relative to the main shaft and the sprocket shaft.

7. The quick disconnect system of claim 1, wherein in the connected configuration, one or more interlocking elements of the main shaft interlock with one or more main shaft complementary interlocking elements of the coupler, and one or more interlocking elements of the sprocket shaft interlock one with or more sprocket shaft complementary interlocking elements of the coupler.

8. The quick disconnect system of claim 7, wherein the one or more main shaft complementary interlocking elements of the coupler are disposed on an inner surface of an interlocking body of the coupler; and wherein the one or more sprocket shaft complementary interlocking elements of the coupler are disposed on an outer surface of the interlocking body of the coupler.

9. The quick disconnect system of claim 7, wherein the interlocking elements of the coupler, the main shaft, and the sprocket shaft comprise interlocking teeth.

10. The quick disconnect system of claim 1, wherein the release button is actuated by pressing on a front surface of the release button.

11. The quick disconnect system of claim 1, further comprising a spring configured to return the release button from an actuated position to an unactuated position.

12. The quick disconnect system of claim 1, wherein the main shaft is coupled to an engine of a vehicle, and wherein the sprocket shaft is coupled to wheels of the vehicle.

13. The quick disconnect system of claim 12, wherein the quick disconnect system is held in place within the vehicle by one or more bearing blocks.

14. A method for disconnecting a main shaft and a sprocket shaft, comprising:
   actuating a release button to release a coupler from a connected configuration, wherein the coupler connects the main shaft to the sprocket shaft to facilitate a transfer of torque between the main shaft and the sprocket shaft in the connected configuration;
   moving a handle housing the release button and the coupler while actuating the release button to move the coupler to a disconnected configuration, wherein the main shaft is configured to rotate relative to the sprocket shaft in the disconnected configuration; and
   releasing the release button to secure the coupler in the disconnected configuration.

15. The method of claim 14, wherein in the connected configuration, one or more engagement features are positioned within a first groove of the main shaft; and wherein in the disconnected configuration, the one or more engagement features are positioned within a second groove of the main shaft.

16. The method of claim 15, wherein actuating the release button to release the coupler in the connected configuration comprises actuating the release button to align a groove of the release button with the one or more engagement features such that the coupler is free to move relative to the main shaft and the sprocket shaft.

17. The method of claim 14, further comprising:
actuating the release button to release the coupler from the disconnected configuration;
moving the handle housing the release button and the coupler while actuating the release button to move the coupler to the connected configuration; and
releasing the release button to secure the coupler in the connected configuration.

18. The method of claim 14, wherein the main shaft is coupled to an engine of a vehicle and the sprocket shaft is coupled to wheels of the vehicle.

19. The method of claim 14, wherein actuating the release button comprises pressing on a front surface of the release button.

20. The method of claim 14, wherein releasing the release button comprises allowing the release button to move from an actuated position to an unactuated position.

21. A quick disconnect system, comprising:
a main shaft;
a sprocket shaft mounted around the main shaft;
a coupler configured to move relative to the main shaft and the sprocket shaft between a connected configuration wherein the coupler is configured to connect the main shaft to the sprocket shaft such that torque is transferred between the main shaft and the sprocket shaft, and a disconnected configuration wherein the main shaft is configured to rotate relative to the sprocket shaft;
a release button configured to be actuated to release the coupler from the connected configuration or configured to be actuated to release the coupler from the disconnected configuration; and
one or more engagement features configured to be housed by the coupler and to engage the main shaft.

22. The quick disconnect system of claim 21, wherein the main shaft comprises a first groove and a second groove configured to receive the one or more engagement features.

23. The quick disconnect system of claim 22, wherein in the connected configuration, the one or more engagement features are positioned within the first groove of the main shaft; and wherein in the disconnected configuration, the one or more engagement features are positioned within the second groove of the main shaft.

24. The quick disconnect system of claim 23, wherein the one or more engagement features comprise one or more balls.

25. The quick disconnect system of claim 21, further comprising a handle configured to move the coupler relative to the main shaft and the sprocket shaft.

26. The quick disconnect system of claim 21, wherein in the connected configuration, one or more interlocking elements of the main shaft interlock with one or more main shaft complementary interlocking elements of the coupler, and one or more interlocking elements of the sprocket shaft interlock one with or more sprocket shaft complementary interlocking elements of the coupler.

27. The quick disconnect system of claim 26, wherein the one or more main shaft complementary interlocking elements of the coupler are disposed on an inner surface of an interlocking body of the coupler; and wherein the one or more sprocket shaft complementary interlocking elements of the coupler are disposed on an outer surface of the interlocking body of the coupler.

28. The quick disconnect system of claim 26, wherein the interlocking elements of the coupler, the main shaft, and the sprocket shaft comprise interlocking teeth.

29. The quick disconnect system of claim 21, wherein the release button is actuated by pressing on a front surface of the release button.

30. The quick disconnect system of claim 21, further comprising a spring configured to return the release button from an actuated position to an unactuated position.

31. The quick disconnect system of claim 21, wherein the main shaft is coupled to an engine of a vehicle, and wherein the sprocket shaft is coupled to wheels of the vehicle.

32. The quick disconnect system of claim 31, wherein the quick disconnect system is held in place within the vehicle by one or more bearing blocks.

\* \* \* \* \*